(12) United States Patent
Lu et al.

(10) Patent No.: US 11,668,861 B2
(45) Date of Patent: Jun. 6, 2023

(54) POLYHEDRON LENS ARCHITECTURE AND LENS SCANNING METHOD SUITABLE FOR THE POLYHEDRON LENS ARCHITECTURE

(71) Applicant: ASPEED Technology Inc., Hsinchu (TW)

(72) Inventors: Chung-Yen Lu, Hsinchu (TW); Hsin-Yu Chen, Hsinchu (TW); Bing-Chia Peng, Hsinchu (TW)

(73) Assignee: ASPEED TECHNOLOGY INC., Hsinchu (TW)

( * ) Notice: Subject to any disclaimer, the term of this patent is extended or adjusted under 35 U.S.C. 154(b) by 267 days.

(21) Appl. No.: 16/919,965

(22) Filed: Jul. 2, 2020

(65) Prior Publication Data

US 2021/0003747 A1 Jan. 7, 2021

(30) Foreign Application Priority Data

Jul. 4, 2019 (TW) ................................. 108123671
Nov. 20, 2019 (TW) ................................. 108142148

(51) Int. Cl.
  *G02B 3/08* (2006.01)
  *H04N 23/68* (2023.01)
(52) U.S. Cl.
  CPC ............. *G02B 3/08* (2013.01); *H04N 23/689* (2023.01); *H04N 23/6842* (2023.01)

(58) Field of Classification Search
None
See application file for complete search history.

(56) References Cited

U.S. PATENT DOCUMENTS

| | | | | |
|---|---|---|---|---|
| 9,973,695 | B1* | 5/2018 | Meier | H04N 5/2353 |
| 10,019,632 | B2* | 7/2018 | Aguilar | H04N 5/2256 |
| 10,291,828 | B1* | 5/2019 | Hsu | H04N 13/243 |
| 11,281,087 | B2* | 3/2022 | Takenaka | G03B 37/04 |
| 2014/0132788 | A1* | 5/2014 | Ramsay | H04N 5/23238 |
| | | | | 348/218.1 |
| 2017/0187956 | A1* | 6/2017 | Fink | H04N 5/2258 |

FOREIGN PATENT DOCUMENTS

TW M481425 U 7/2014

* cited by examiner

*Primary Examiner* — James M Hannett
(74) *Attorney, Agent, or Firm* — Muncy, Geissler, Olds & Lowe, P.C.

(57) ABSTRACT

A polyhedron lens architecture is disposed in a virtual sphere. The virtual sphere has a horizontal plane, an upper hemisphere above the horizontal plane and a lower hemisphere below the horizontal plane. The polyhedron lens architecture has an upper half part above the horizontal plane, and a lower half part below the horizontal plane. The polyhedron lens architecture includes: multiple bases, which are respectively disposed on the upper half part and the lower half part; and multiple lenses respectively disposed on surfaces of the bases. Optical axes of the lenses intersect at a central point, which is located at the horizontal plane and is a structural center of the polyhedron lens architecture.

8 Claims, 23 Drawing Sheets

POLYHEDRON LENS ARCHITECTURE AND LENS SCANNING METHOD SUITABLE FOR THE POLYHEDRON LENS ARCHITECTURE

CROSS-REFERENCE TO RELATED APPLICATIONS

This application claims priorities of Nos. 108123671 and 108142148 respectively filed in Taiwan R.O.C. on Jul. 4, 2019 and Nov. 20, 2019 under 35 USC 119, the entire contents of which are hereby incorporated by reference.

BACKGROUND OF THE INVENTION

Field of the Invention

The invention relates to a polyhedron lens architecture and a lens scanning method suitable for the polyhedron lens architecture, and more particularly to a polyhedron lens architecture for improving lens interleave defects of a rolling shutter, and a scanning method thereof.

Description of the Related Art

Please refer to FIGS. 1A and 1B. FIG. 1A shows a simplified structure diagram of the prior art. FIG. 1B shows an equirectangular projection view of FIG. 1A. Please note that FIG. 1A shows a lens structure of a regular hexahedron, each surface depicted therein is provided with a lens (not shown), the lenses are respectively mounted on six surfaces in the drawing, and the lenses concurrently capture a 360-degree view to generate six lens images. In addition, in the equirectangular projection view of FIG. 1B, mapping relationships are present between the equirectangular projection view and the six lens images, a region b1 corresponds to a right ahead image of a region a1 of FIG. 1A, a region b2 corresponds to a right behind image of the region a1, and other regions of the equirectangular projection view are obtained by mosaicking the overlapped parts of images scanned by the corresponding lenses, and the arrow represents the line-by-line scan of the lens.

Due to the line-by-line scan of the rolling shutter of the prior art, as indicated by a scan pattern of arrows, it is assumed that the scan starting time at the scan position sU_s and the scan starting time at the scan position sD_s are the same as each other. Thus, when the lens image is scanned from the position sU_s to the end position sU_e, a time difference is present between the scan times at the positions sU_e and sD_s, so the image defects are caused by the scan time difference in portions of the neighboring images (e.g., the peripheral portions at the positions sU_e and sD_s indicated by a dotted frame). When the 360-degree camera (e.g., the lens structure of the regular hexahedron) has the great frame difference and the poor image mosaicking defects in the lens interleave portion, as shown in the region indicated by the dotted frame, the defects become more obvious when the dynamic images are captured.

BRIEF SUMMARY OF THE INVENTION

The invention is to improve the image defect caused by the line-by-line scan time difference of the conventional rolling shutter.

The invention provides a polyhedron lens architecture, wherein a lens surface of each lens is inscribed to a virtual sphere.

The invention provides a polyhedron lens architecture, wherein optical axes of the lenses intersect at a structural center.

According to an embodiment of the invention, a polyhedron lens architecture disposed in a virtual sphere is provided. The virtual sphere has a horizontal plane, an upper hemisphere above the horizontal plane, and a lower hemisphere below the horizontal plane, wherein the polyhedron lens architecture has an upper half part above the horizontal plane and a lower half part below the horizontal plane, the polyhedron lens architecture includes: multiple bases, which are respectively disposed on the upper half part and the lower half part; and multiple lenses respectively disposed on surfaces of the bases; wherein optical axes of the lenses intersect at a central point, the central point is located at the horizontal plane, and the central point is a structural center of the polyhedron lens architecture.

According to an embodiment of the invention, a lens scanning method suitable for a polyhedron lens architecture disposed in a virtual sphere is provided. The virtual sphere has a horizontal plane, an upper hemisphere above the horizontal plane, and a lower hemisphere below the horizontal plane, wherein the polyhedron lens architecture has an upper half part above the horizontal plane and a lower half part below the horizontal plane. The lens scanning method includes: a rolling shutter scan step, wherein all lenses located at the upper half part concurrently scan from the horizontal plane to an apex of the upper hemisphere, and all lenses located at the lower half part also concurrently scan from the horizontal plane to an apex of the lower hemisphere.

According to an embodiment of the invention, a lens scanning method suitable for a polyhedron lens architecture is provided. The polyhedron lens architecture is disposed in a virtual sphere having a horizontal plane, an upper hemisphere above the horizontal plane, and a lower hemisphere below the horizontal plane, wherein the polyhedron lens architecture has an upper half part above the horizontal plane and a lower half part below the horizontal plane. The lens scanning method includes: a rolling shutter scan step, wherein all lenses located at the upper half part and all lenses located at the lower half part respectively and concurrently perform scanning from an apex of the upper hemisphere and an apex of the lower hemisphere to the horizontal plane.

According to an embodiment of the invention, a lens scanning method suitable for a polyhedron lens architecture is provided. The polyhedron lens architecture is disposed in a virtual sphere having a horizontal plane, an upper hemisphere above the horizontal plane, and a lower hemisphere below the horizontal plane, wherein the polyhedron lens architecture has an upper half part above the horizontal plane and a lower half part below the horizontal plane. The lens scanning method includes: a rolling shutter scan step, wherein all lenses located at the upper half part concurrently perform scanning from an apex of the upper hemisphere to the horizontal plane, and all lenses of the lower half part continue to perform concurrent scanning from the horizontal plane to an apex of the lower hemisphere.

DETAILED DESCRIPTION OF THE INVENTION

Figure 1A:
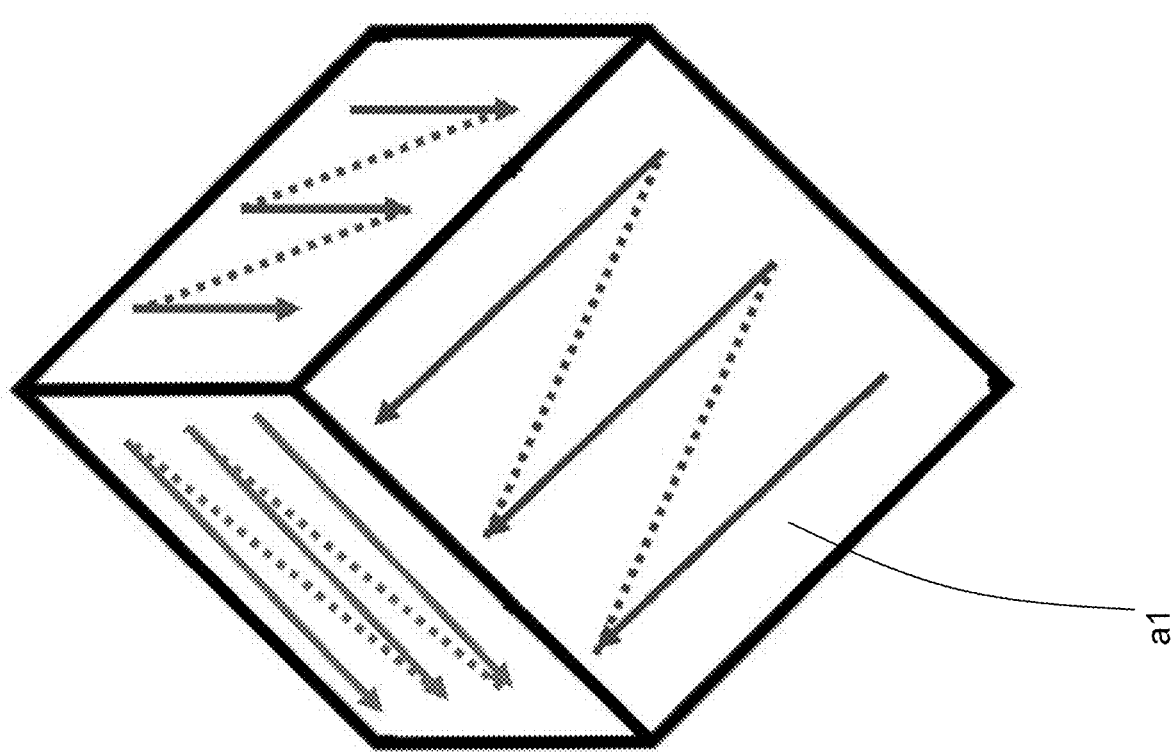
FIG. 1A shows a simplified structure diagram of the prior art.
Figure 1B:
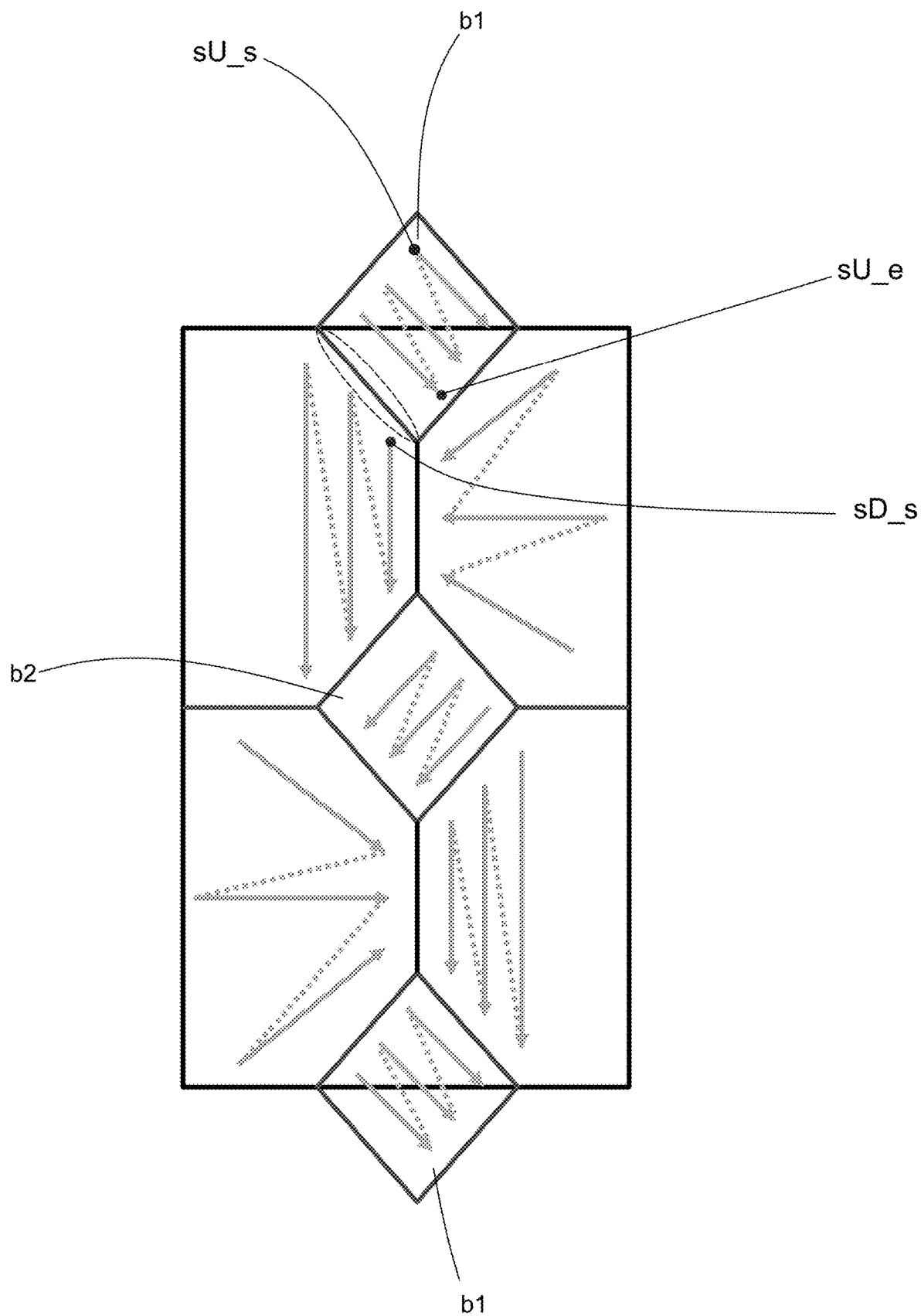
FIG. 1B shows an equirectangular projection view of FIG. 1A.
Figure 2A:
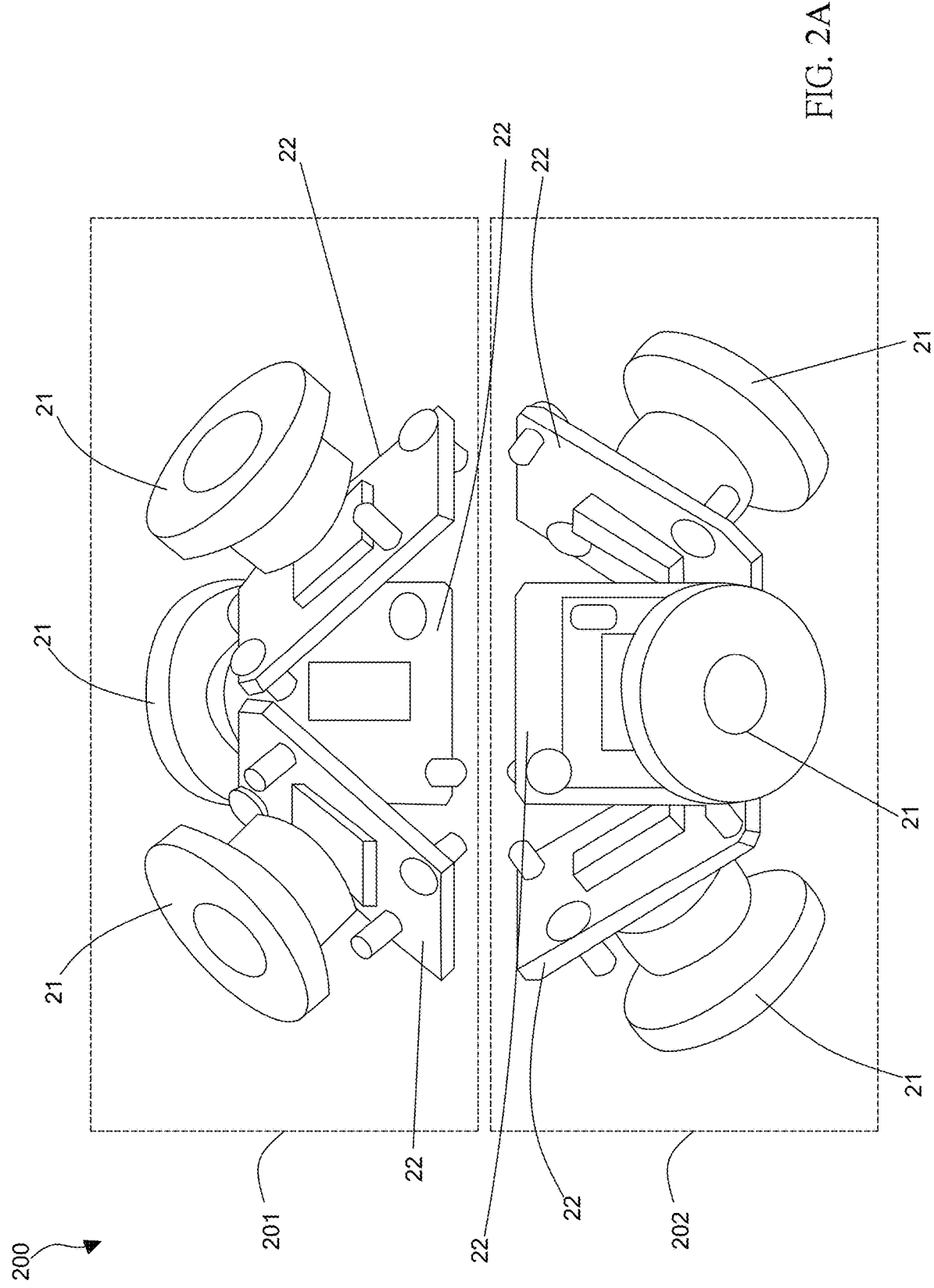
FIG. 2A is a front-side pictorially schematic decomposed view showing a polyhedron lens architecture according to an embodiment of the invention.
Figure 2B:
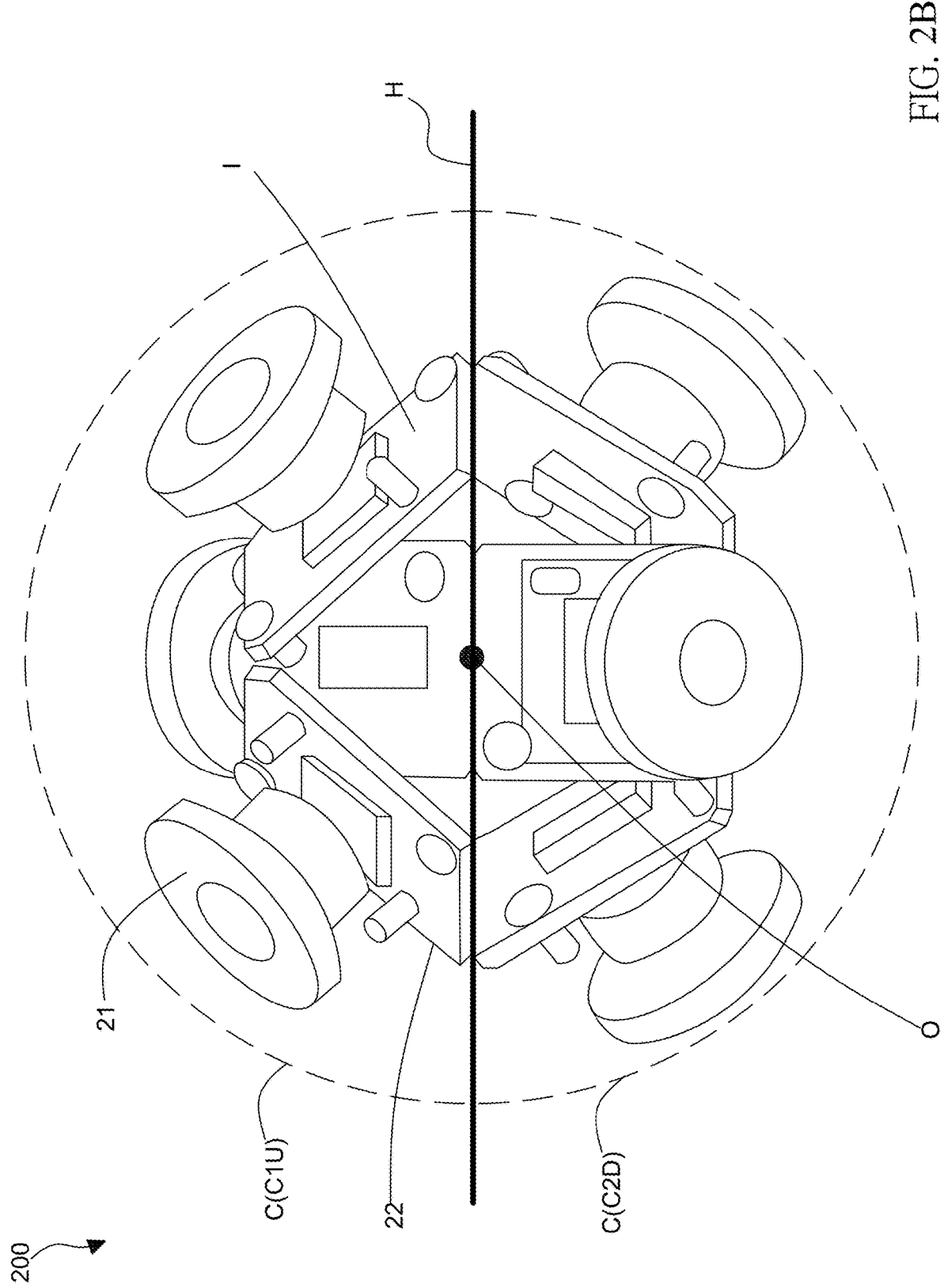
FIG. 2B is a front-side pictorial view showing the polyhedron lens architecture according to the embodiment of the invention.

FIG. 2A is a front-side pictorially schematic decomposed view showing a polyhedron lens architecture according to an embodiment of the invention. FIG. 2B is a front-side pictorial view showing the polyhedron lens architecture according to the embodiment of the invention. Referring to FIGS. 2A and 2B, it to be noted that a polyhedron lens architecture 200 is disposed in a virtual sphere C (the virtual sphere C depicted by dashed lines). The virtual sphere C being an imaginary sphere has a horizontal plane H, which is also a virtual horizontal plane. The polyhedron lens architecture 200 has an upper half part 201 (or an upper hemisphere C1U of the virtual sphere C) above the horizontal plane H, and a lower half part 202 (or a lower hemisphere C2D of the virtual sphere C) below the horizontal plane H. The polyhedron lens architecture 200 includes multiple lenses 21, and multiple bases 22 having the number corresponding to the number of the lenses 21.

Please note that the bases 22 are respectively disposed on the upper half part 201 and the lower half part 202 of the polyhedron lens architecture 200. In this embodiment, there are six lenses 21 in total, wherein three lenses 21 and three bases 22 are disposed on the upper half part 201, and three lenses 21 and three bases 22 are disposed on the lower half part 202 similarly.

The arrangements of the bases 22 on the upper half part 201 and the lower half part 202 start above or below the horizontal plane H, and the base 22 extends up or down to close to an apex N of the upper hemisphere C1U or an apex S of the lower hemisphere C2D (see also FIG. 2C).

The base 22 has a first portion 22a and a second portion 22b. The first portion 22a of each base 22 is arranged, and extends up or down to close to the apex N of the upper hemisphere C1U or the apex S of the lower hemisphere C2D of the virtual sphere C to form an inclined surface I, and the second portion 22b is an extending end of the inclined surface I. In other words, when the base 22 is in the upper hemisphere C1U, the first portion 22a is disposed above the horizontal plane H and extends up to close to an apex N of the upper hemisphere C1U; when the base 22 is in the lower hemisphere C2D, the first portion 22a is below the horizontal plane H and extends up to close to the apex S of the lower hemisphere C2D; wherein the first portion 22a extends to close to the apex N of the upper hemisphere C1U of the virtual sphere C or the apex S of the lower hemisphere C2D of the virtual sphere C to form an inclined surface I. The second portion 22b being a border BD of the base 22.

Figure 2C:
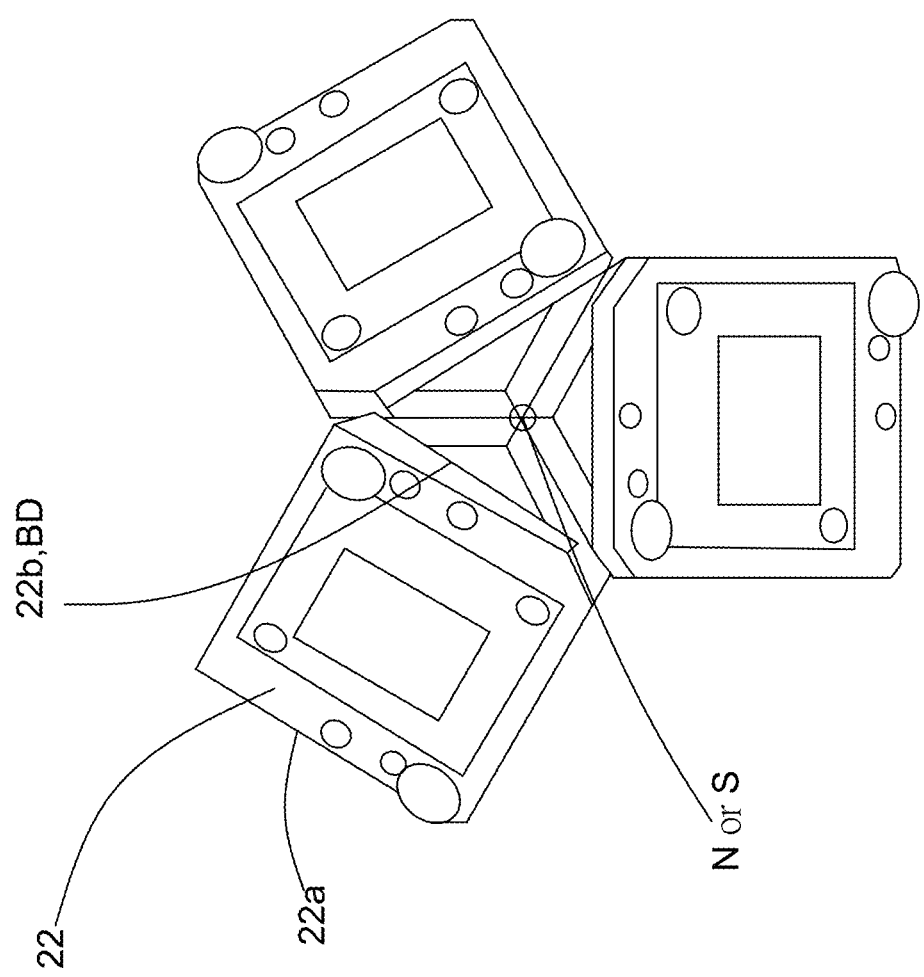
FIG. 2C is a schematic top view of an upper half part or a schematic bottom view of a lower half part showing the polyhedron lens architecture according to the embodiment of the invention.

FIG. 2C is a schematic top view of an upper half part or a schematic bottom view of the lower half part of the polyhedron lens architecture according to the embodiment of the invention. Referring also to FIG. 2C, extending of the inclined surface I ends at a periphery of the apex N of the upper hemisphere C1U or the apex S of the lower hemisphere C2D. The second portion 22b surrounds the apex N or the apex S, the lens 21 is disposed on the inclined surface I, and a connection line connected to the apex N of the upper hemisphere C1U, a central point O, and the apex S of the lower hemisphere C2D is a straight line. In one embodiment, the vertical distance from the apex N or the apex S to the central point O is 24-25 mm, the vertical distance from the apex N or the apex S to the second portion 22b of the base 22 is 9-10 mm and the vertical distance the central point O to outer edge of the bases 22 is 13-14 mm; the second portion 22b surrounds the apex N or the apex S to form a plane, the vertical distance from the plane to the horizontal plane H is 18-20 mm.

In this embodiment, the second portion 22b surrounds the apex of the upper hemisphere C1U or the apex of the lower hemisphere C2D of the virtual sphere C, and edges of the three second portions 22b surround to form a triangle-like structure.

Please note that the inclined surfaces I in this embodiment are interleaved between the upper hemisphere C1U and the lower hemisphere C2D. That is, no overlap is present between the inclined surfaces I or between the bases 22, and normal vectors of the inclined surfaces I are not parallel to each other. No overlap is present between the boundaries of the first portions 22a. In other words, all lenses 21 perform image scan in different directions. In one embodiment, relative positions between the bases 22 of the upper half part 201 are the same as relative positions between the bases 22 of the lower half part 202. In one embodiment, the number of lenses 21 in the upper hemisphere C1U is the same as the number of lenses 21 in the lower hemisphere C2D, the longitudes of the lenses 21 in the upper hemisphere C1U map to longitudes of neighboring edges of arbitrary two lenses 21 in the lower hemisphere C2D.

Figure 2D:
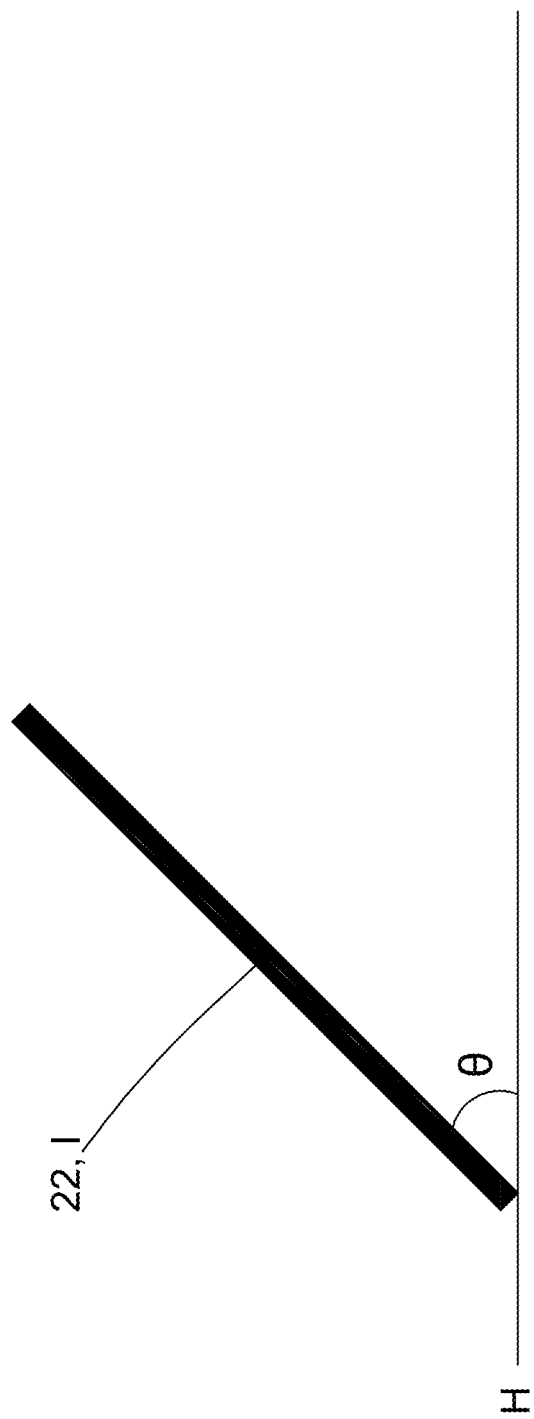
FIG. 2D is a schematic side view showing an included angle.

FIG. 2D is a schematic side view showing an included angle. In this embodiment, the included angle θ between the inclined surface I of the upper half part 201 and the horizontal plane H is implemented by 45 degrees, but the invention should not be restricted thereto, and the included angle θ may also be smaller than 90 degrees.

Please note that the same included angle θ1 (not shown) is present between the horizontal plane H and all inclined surfaces I of the upper half part 201, and the same included angle θ2 (not shown) is present between the horizontal plane H and all inclined surfaces I of the lower half part 202.

Figure 2E:
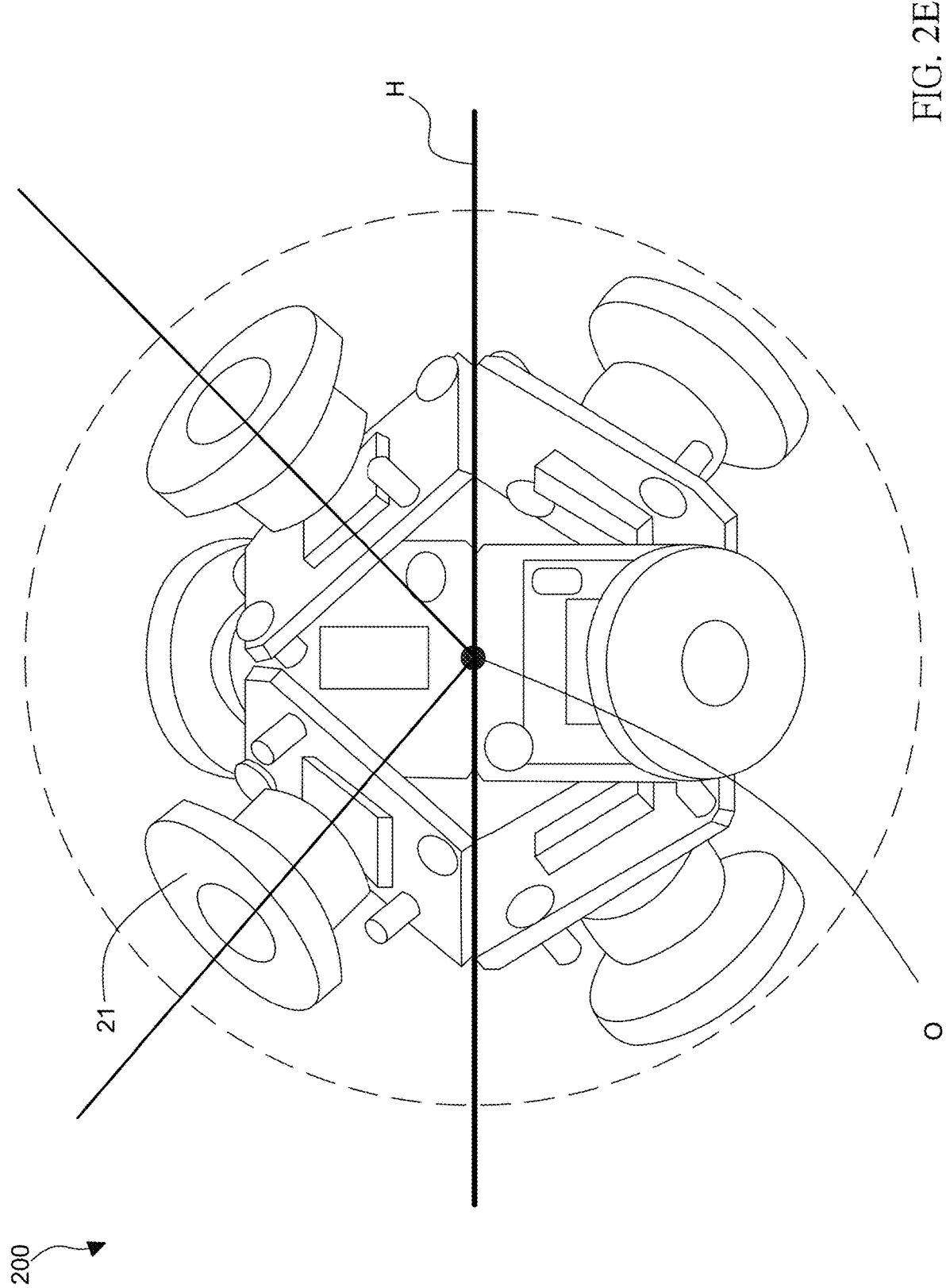
FIG. 2E is a schematic view showing an intersection between optical axes.

FIG. 2E is a schematic view showing an intersection between optical axes. As shown in FIG. 2E, for simplicity to the drawing, this drawing only depicts the optical axes of two lenses 21. Please note that each lens 21 is disposed on the surface of the base 22 or the inclined surface I, and the optical axes of the lenses 21 intersect at the central point O. The central point O is located at the horizontal plane H, and is the structural center of the polyhedron lens architecture 200 or the spherical center of the virtual sphere C. So, the scanning lens image of the lens 21 starts from the central point O through the field of view (hereinafter referred to as FOV) of the lens 21 of each optical axis.

In addition, the lens surface of each lens 21 is inscribed to the virtual sphere C, and the bases 22 are respectively disposed on the upper half part 201 or the lower half part 202 and equally disposed on the upper hemisphere C1U or the lower hemisphere C2D. In another embodiment, all lenses 21 in the upper hemisphere C1U equally divide the longitude of 360 degrees, and all lenses 21 in the lower hemisphere C2D also equally divide the longitude of 360 degrees.

The optical axes corresponding to the lenses 21 are different from one another or each other. In other words, the lenses 21 are individually directed to different directions to form outward optical-axis rays (may also be regarded as the normal vectors of the lenses) from the central point O to the lens centers, wherein the included angle between an arbitrary optical axis ray and the horizontal plane H is smaller than 90 degrees. In this embodiment, the central point O may be regarded as the spherical center of the virtual sphere C.

Figure 2F:
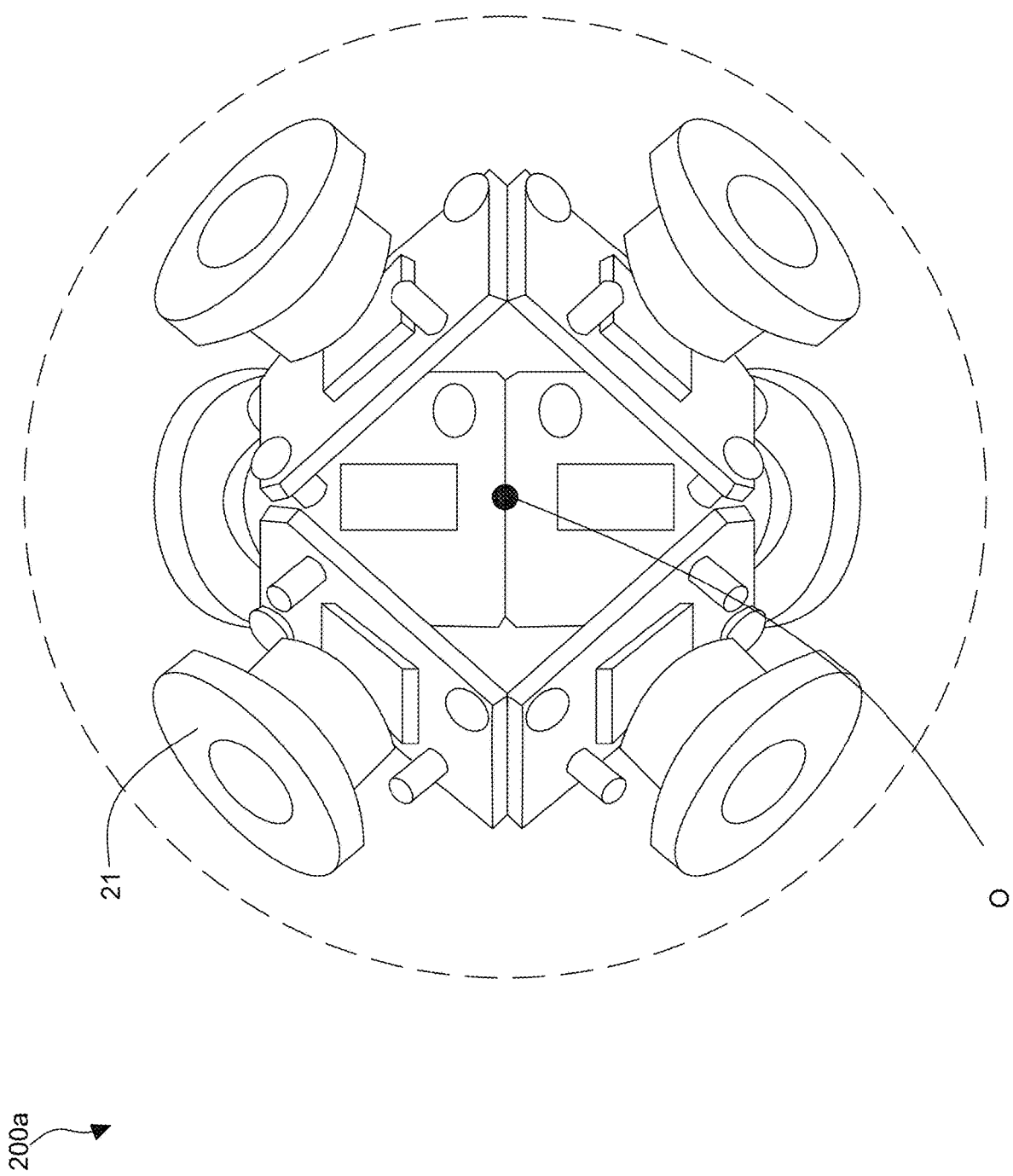
FIG. 2F is a front-side pictorial view showing a polyhedron lens architecture according to an embodiment of the invention.

FIG. 2F is a front-side pictorial view showing a polyhedron lens architecture 200a according to an embodiment of the invention. Referring also to FIG. 2F in another embodiment, the bases 22 of the upper half part 201 and the bases 22 of the lower half part 202 are disposed and symmetrical with respect to the horizontal plane H. That is, no overlap is present between the inclined surfaces I or between the bases 22, but the overlap is present between the boundaries of the first portions 22a of the bases 22 of the upper half part 201 and the lower half part 202. In one embodiment, the position of each base 22 of the lower half part 202 may map to the position of each base 22 of the upper half part 201. In one embodiment, the number of lenses 21 in the upper hemisphere C1U is the same as the number of lenses 21 in the lower hemisphere C2D, and the up-down mapping lenses 21 have the consistent longitude and orientation. Other operation principles are the same as those mentioned hereinabove, and detailed descriptions thereof will be omitted here.

Figure 2G:
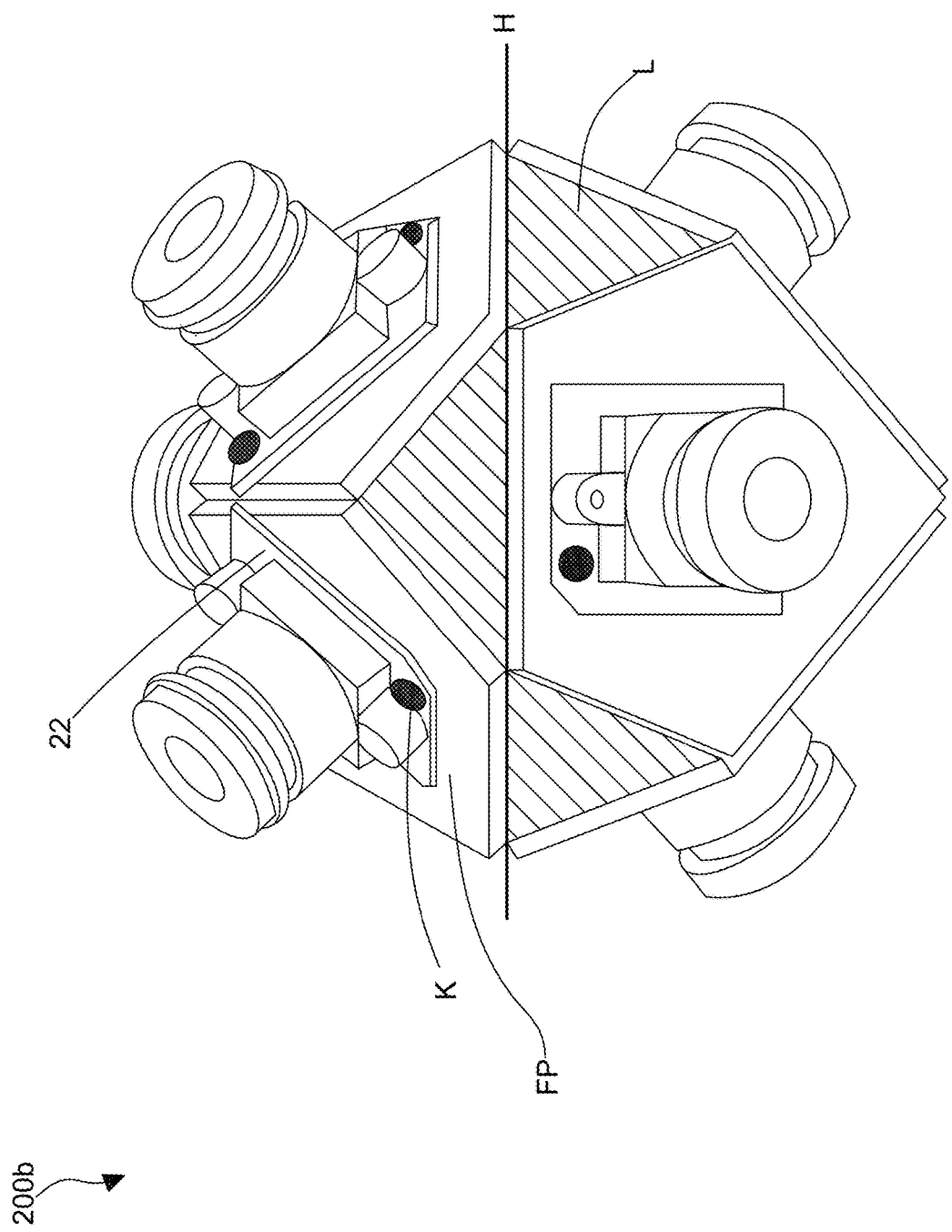
FIG. 2G is a front-side pictorial view showing a polyhedron lens architecture according to an embodiment of the invention.
Figure 2H:
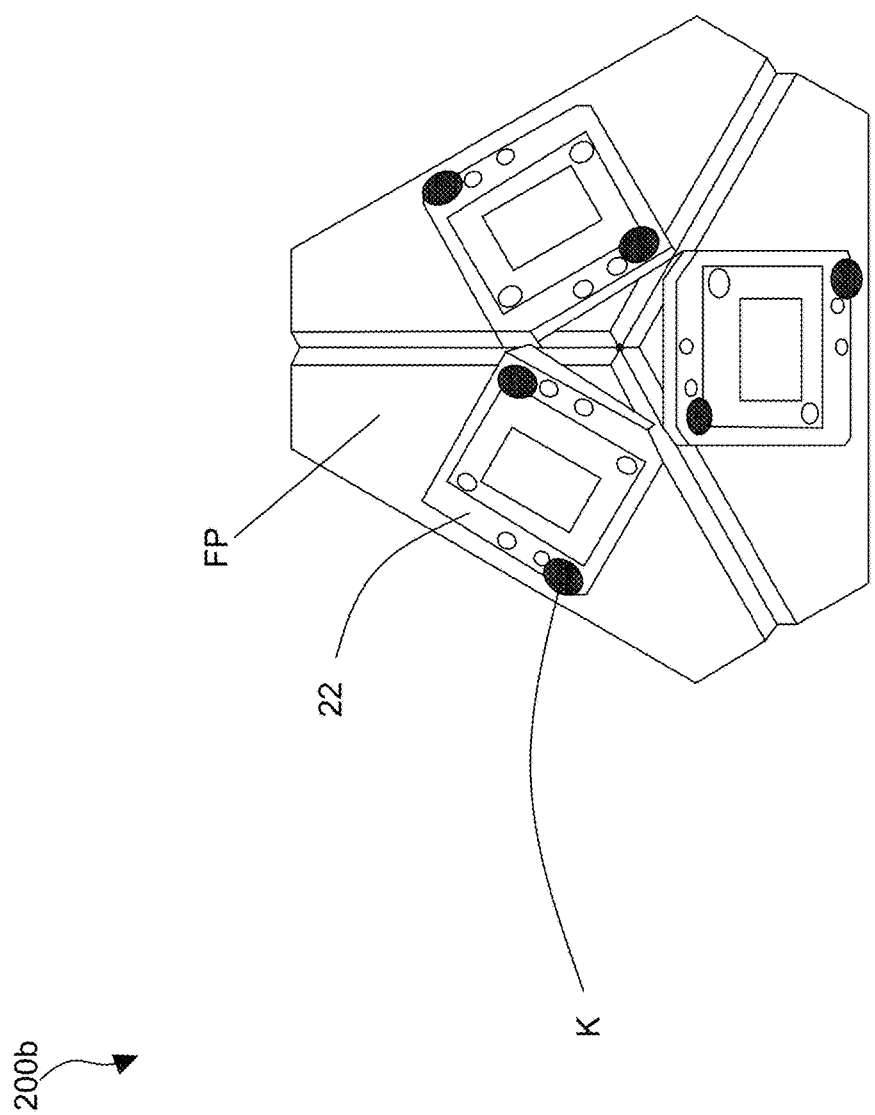
FIG. 2H is a schematic top view of FIG. 2G.

FIG. 2G is a front-side pictorial view showing a polyhedron lens architecture 200b according to an embodiment of the invention. FIG. 2H is a schematic top view of FIG. 2G. Referring also to FIGS. 2G and 2H concurrently, multiple attaching members K are disposed on the base 22 in this embodiment, wherein the attaching member K penetrates through the base 22 and a fixing plate 22a, and the attaching member K fixes the base 22 onto the fixing plate 22a. One end of the attaching member K penetrates through the other surface of the base 22 to fix the base 22 onto the fixing plate 22a, and a triangular cover plate L is disposed between the neighboring fixing plates 22a. At a connection portion between the apex of the triangular cover plate L and the apex of the neighboring triangular cover plate L, the fixing plate 22a and the triangular cover plate L constitute a polyhedron structure and cover the central point O.

The base 22 partially covers the fixing plate 22a, and the inclined surface I is parallel to the surface of the fixing plate 22a. In this embodiment, the fixing plate 22a is a pentagonal flat plate, the apex of the fixing plate 22a located at the upper half part 201 overlaps with the apex of the upper hemisphere C1U. Correspondingly, the apex of the fixing plate 22a located at the lower half part 202 overlaps with the apex of the lower hemisphere C2D, as shown in the top view of the polyhedron lens architecture 200b in FIG. 2E.

Figure 3:
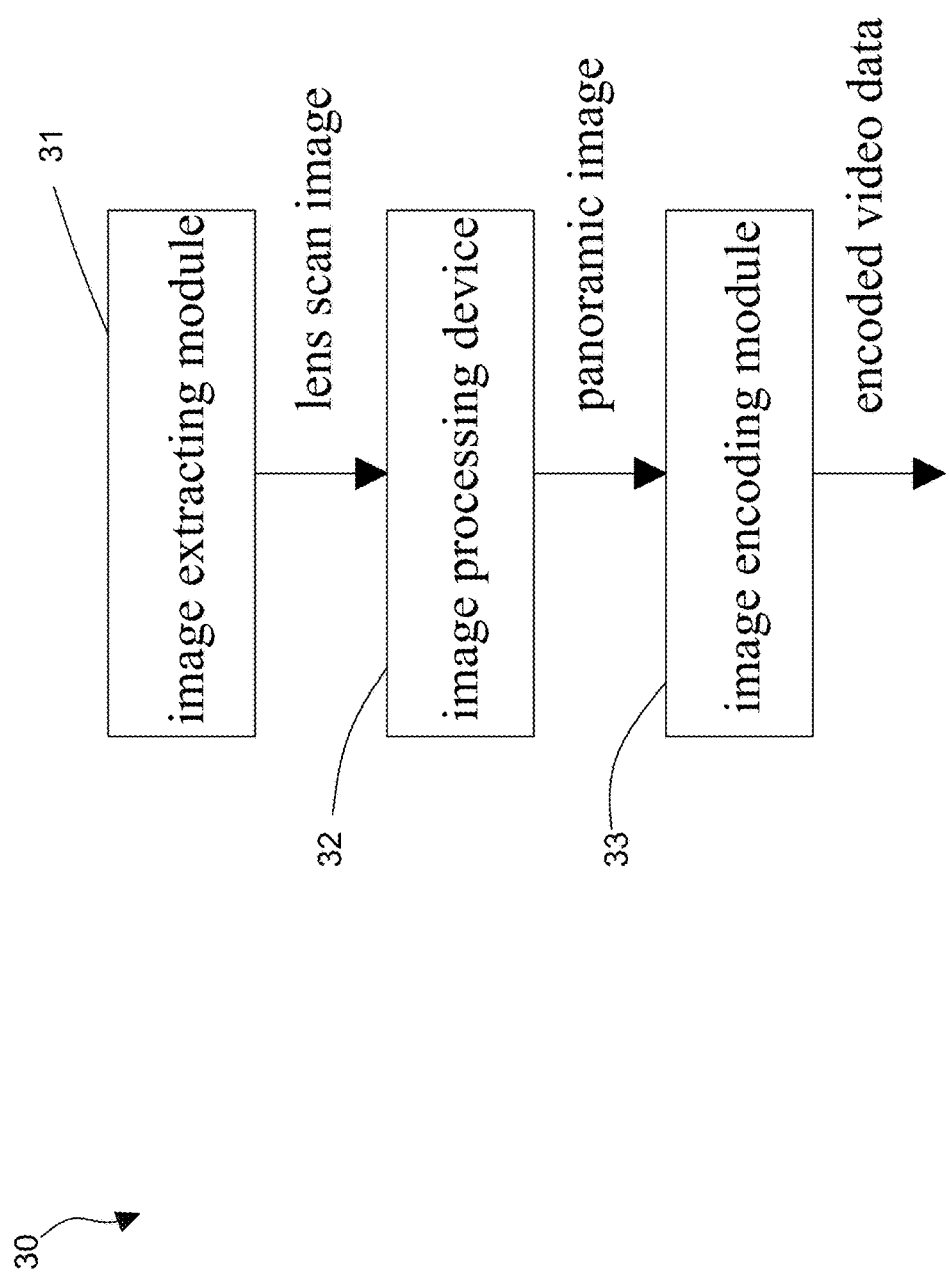
FIG. 3 is a schematic view showing a panoramic image processing system 30 suitable for a polyhedron lens architecture of the invention.

FIG. 3 is a schematic view showing a panoramic image processing system 30 suitable for a polyhedron lens architecture of the invention. Referring also to FIG. 3, the panoramic image processing system 30 of the invention includes an image extracting module 31, an image processing device 32, and an image encoding module 33. The image extracting module 31 can capture a field of vision, having a 360-degree horizontal FOV and a 180-degree vertical FOV, to generate multiple lens images. After receiving the lens scan image from the image extracting module 31, the image processing device 32 generates a panoramic image. Finally, the image encoding module 33 encodes the panoramic image, and transmits the encoded video data.

In one embodiment, in order to capture a field of vision having a 360-degree horizontal FOV and a 180-degree vertical FOV, the image extracting module 31 includes multiple lenses 21, which cover a 360-degree horizontal FOV and a 180-degree vertical FOV of the system. For example, as shown in FIG. 2B, the image extracting module 31 in this embodiment includes six lenses 21. Each of the lenses 21 is disposed on one surface of one base 22 to concurrently capture a real world FOV having a 360-degree horizontal FOV and a 180-degree vertical FOV and to generate six lens images. One essential condition for setting up the image extracting module 31 is that a sufficient overlap should be present between the FOVs of arbitrary two neighboring lenses to promote image mosaicking. Please note that as long as a FOV with horizontal 360 degrees and vertical 180 degrees can be captured, the invention does not restrict the number of lenses included in the image extracting module 31. The example of the panoramic image includes, for example but without limitation to, a 360-degree panoramic image and an equirectangular panoramic image.

Figure 4A:
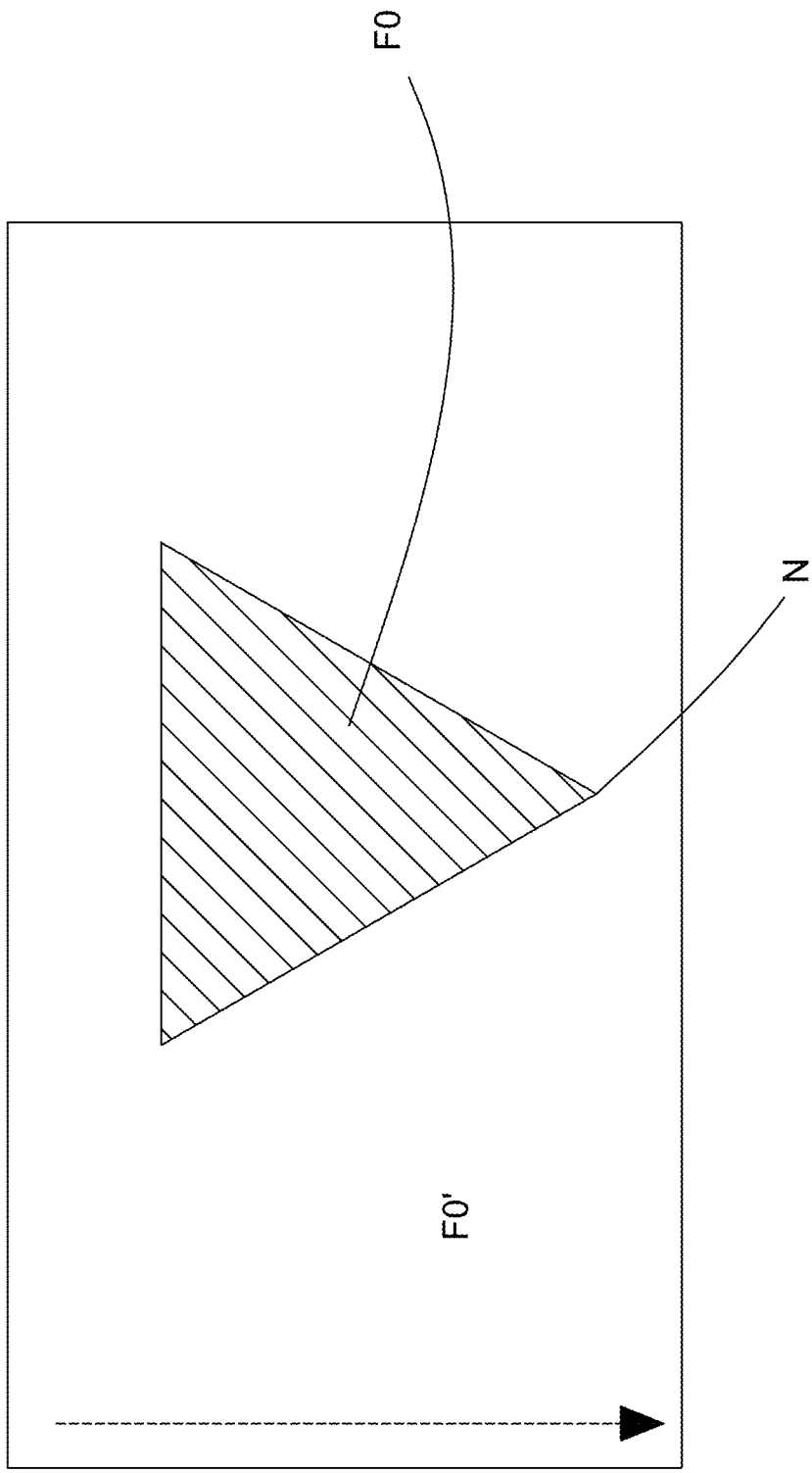
FIG. 4A is a schematic view showing a lens scan image F0' of an embodiment and an effective image.
Figure 4B:
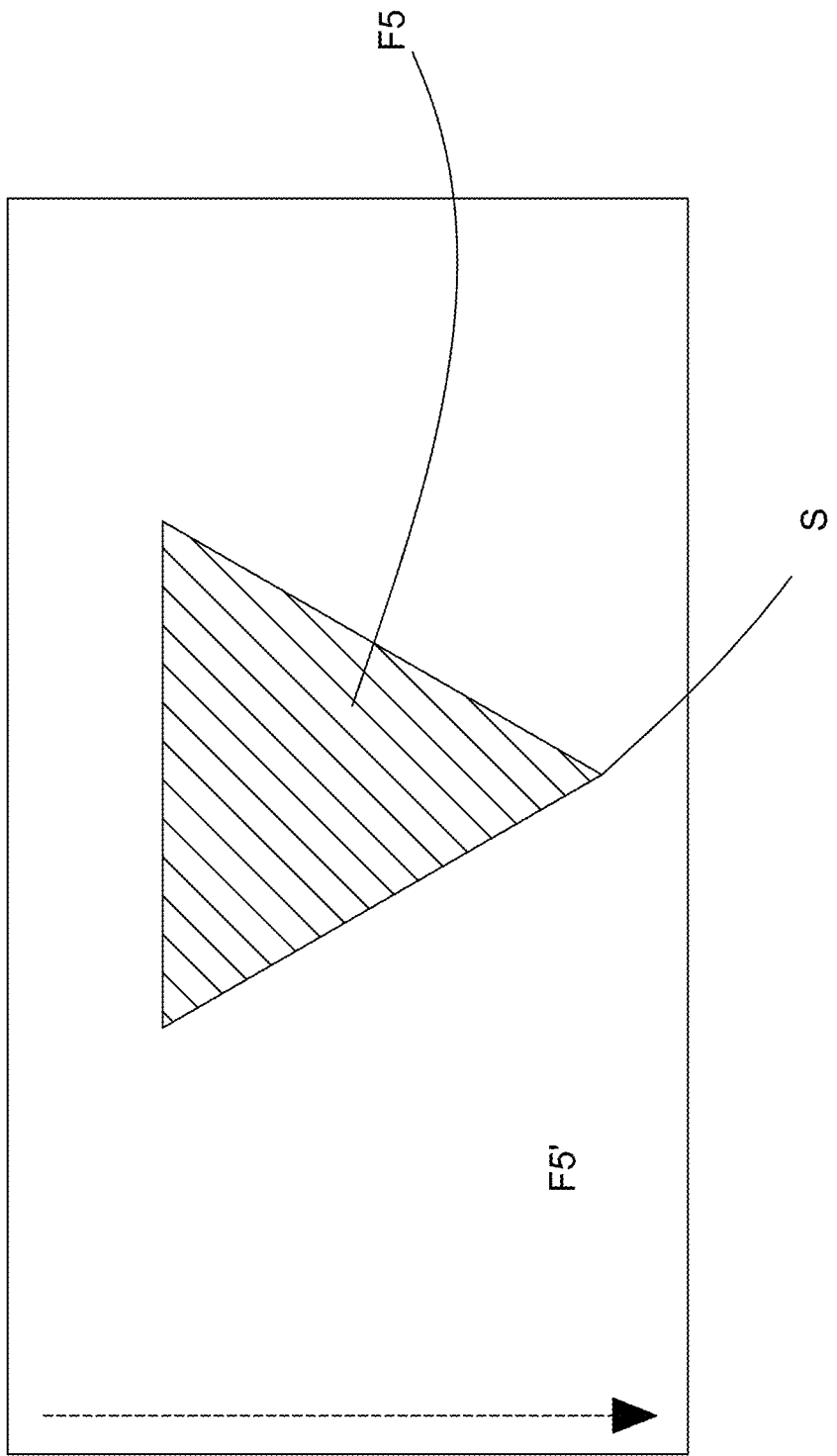
FIG. 4B is a schematic view showing a lens scan image F5' of an embodiment and an effective image.
Figure 4C:
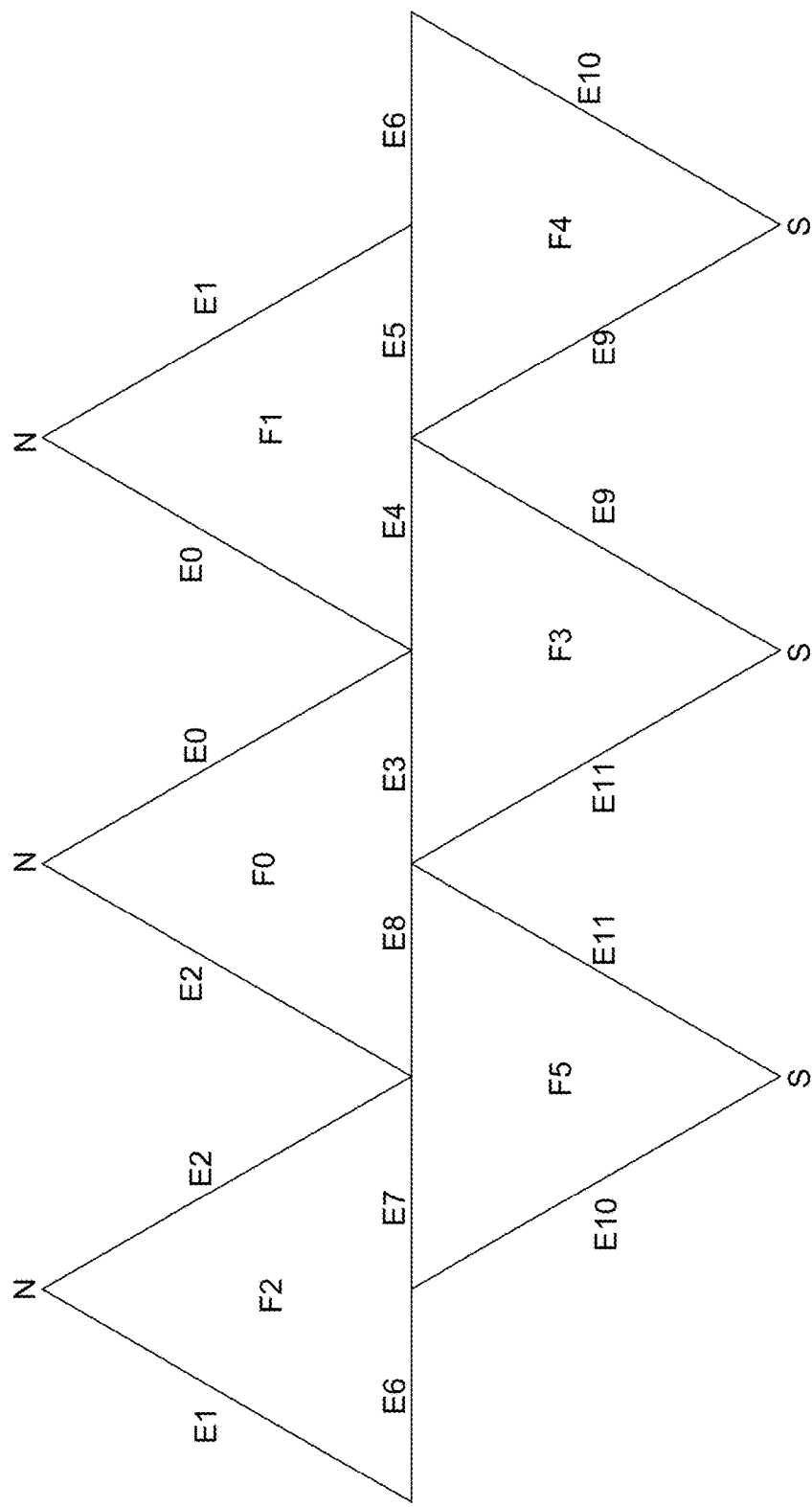
FIG. 4C is a schematic view showing a combination of all effective images.
Figure 4D:
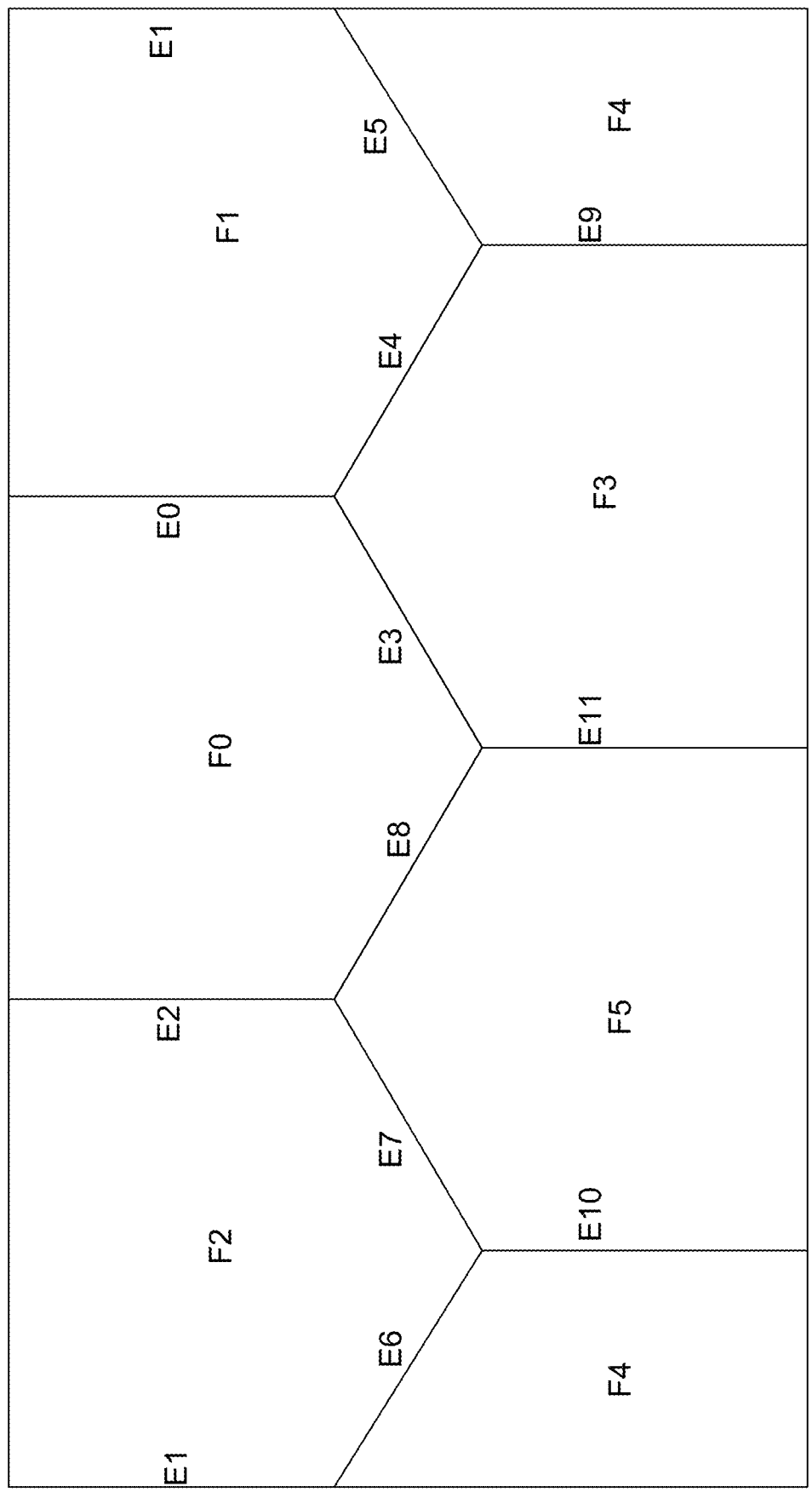
FIG. 4D shows an equirectangular schematic view of FIG. 4C.

Please refer to FIGS. 4A to 4D. FIG. 4A is a schematic view showing an upper-half-part lens scan image F0' of an embodiment and an effective image F0. FIG. 4B is a schematic view showing a lower-half-part lens scan image F5' of an embodiment and an effective image F5. FIG. 4C is a schematic view showing a combination of all effective images. FIG. 4D shows an equirectangular schematic view of FIG. 4C.

Please note that FIGS. 4A and 4B show the rolling shutter sensor image, wherein the scan direction of the rolling shutter scan thereof is inevitably the grating scan (from top to bottom); and the difference between the lens of the upper half part 201 and the lens of the lower half part 202 is that the lens of the upper half part 201 is disposed with a rotation of 180 degrees.

In this embodiment, the lens scanning method of the polyhedron lens architecture is suitable for the polyhedron lens architecture, and the upper half part 201 and the lower half part 202 of the polyhedron lens architecture 200 in this embodiment are not symmetrical about the horizontal plane H. In addition, when the polyhedron lens architecture 200 is performing the rolling shutter scan step, all lenses 21 of the upper half part 201 take the horizontal plane H or a plane near the horizontal plane H as the scan start positions; and all lenses 21 of the lower half part take the horizontal plane H or the plane near the horizontal plane H as the scan start positions. All lenses 21 of the upper half part 201 concurrently scan the images toward the apex of the upper hemisphere C1U. Correspondingly, all lenses 21 of the lower half part 202 concurrently scan the images toward the apex of the lower hemisphere C2D. The scan ending position of the lens 21 of the upper hemisphere C1U is the apex N of the upper hemisphere C1U or the point near the apex N, and the scan ending position of the lenses 21 of the lower hemisphere C2D is the apex S of the lower hemisphere C2D or the point near the apex S, wherein the line-by-line scan is indicated by the arrow in the drawing, as shown in FIGS. 4A and 4B.

Please note that the rolling shutter scan represents that the lenses perform the scans from top to bottom in a manner similar to the operation of the curtain, wherein the shutters in the columns are the same. In one embodiment, pixel values are sequentially outputted from left to right.

Next, the image extracting module 31 can perform scanning to generate the lens scan images F0' to F5' corresponding to each lens 21. For the sake of conciseness, FIGS. 4A and 4B only take the lens scan images F0' and F5' for explanation. Because the lens scan image F0' is scanned by the lenses 21 of the upper half part 201, an apex of the effective image F0 is the apex N of the upper hemisphere C1U. On the contrary, if the lens scan image is scanned by the lenses 21 of the lower half part 202, then an apex of the effective image is the apex S of the lower hemisphere C2D, wherein the remaining principles are the same.

The lens scan image F0' is generated by way of scanning from the central point O according to the optical axis of the lens 21 and the corresponding FOV, and the effective image F0 (the hatched region in FIG. 4B) is obtained by the image processing device 32 capturing its effective portion from the lens scan image F0' according to the user's requirement. That is, each lens 21 and its corresponding optical axis and FOV can generate the lens scan images F0' to F5', and then the image processing device 32 processes the images to obtain the effective images F0 to F5, as shown in FIG. 4C.

Finally, the image processing device 32 performs the image mosaicking processing on the effective images F0 to F5 to generate the equirectangular panoramic image, as shown in FIG. 4D, wherein the image boundaries E0 to E10 represent the image boundaries corresponding to the effective images F0 to F5.

In this embodiment, because there is a difference between the FOVs of the lenses 21, the scan start position of the lens 21 may be located at the horizontal plane H or the plane near the horizontal plane H. Because generating times of the boundaries E3 to E8 of the effective images F0 to F5 are the same as or close to each other, it is possible to solve the conventional problems of the large generated frame difference between the lens interleave portions and the poor image mosaicking.

Figure 5A:
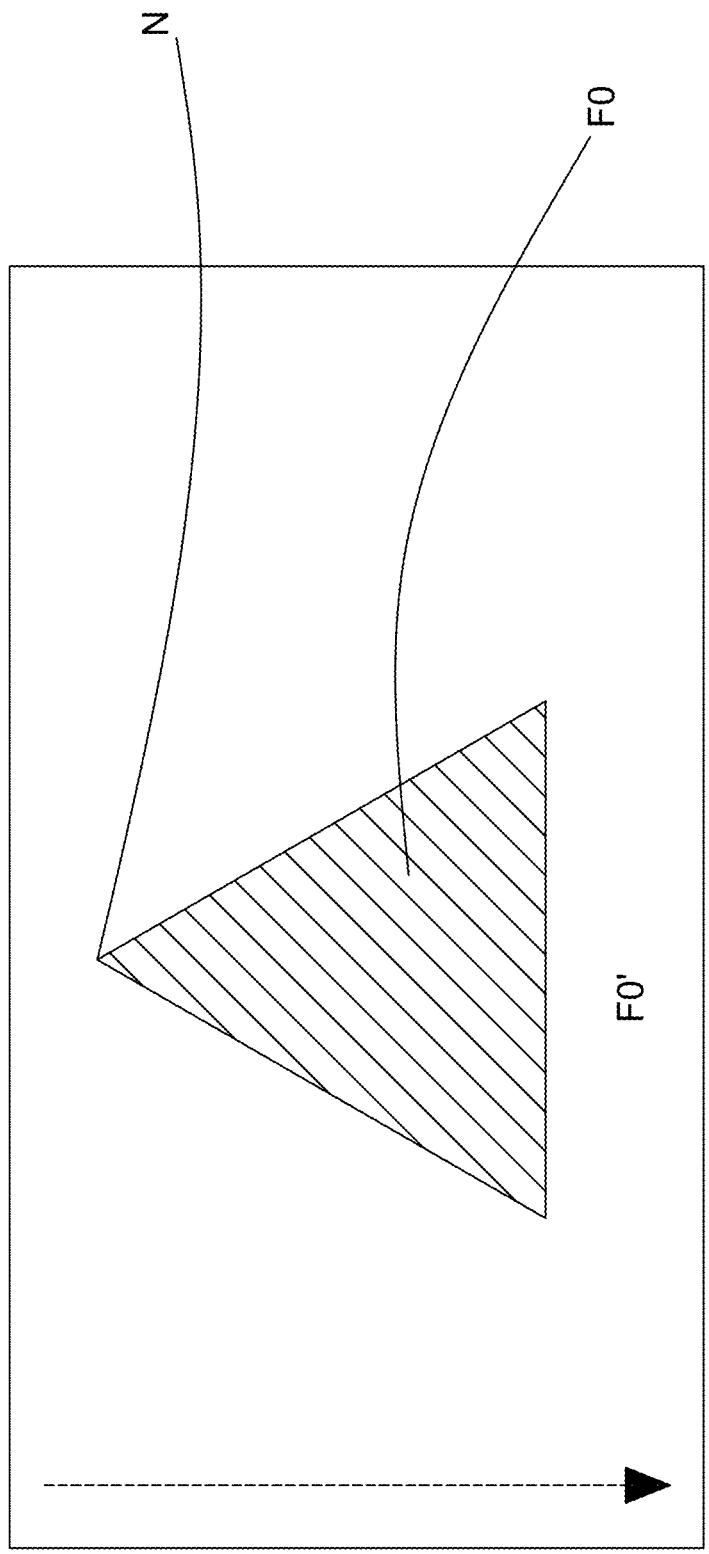
FIG. 5A is a schematic view showing the lens scan image F0' of an embodiment.
Figure 5B:
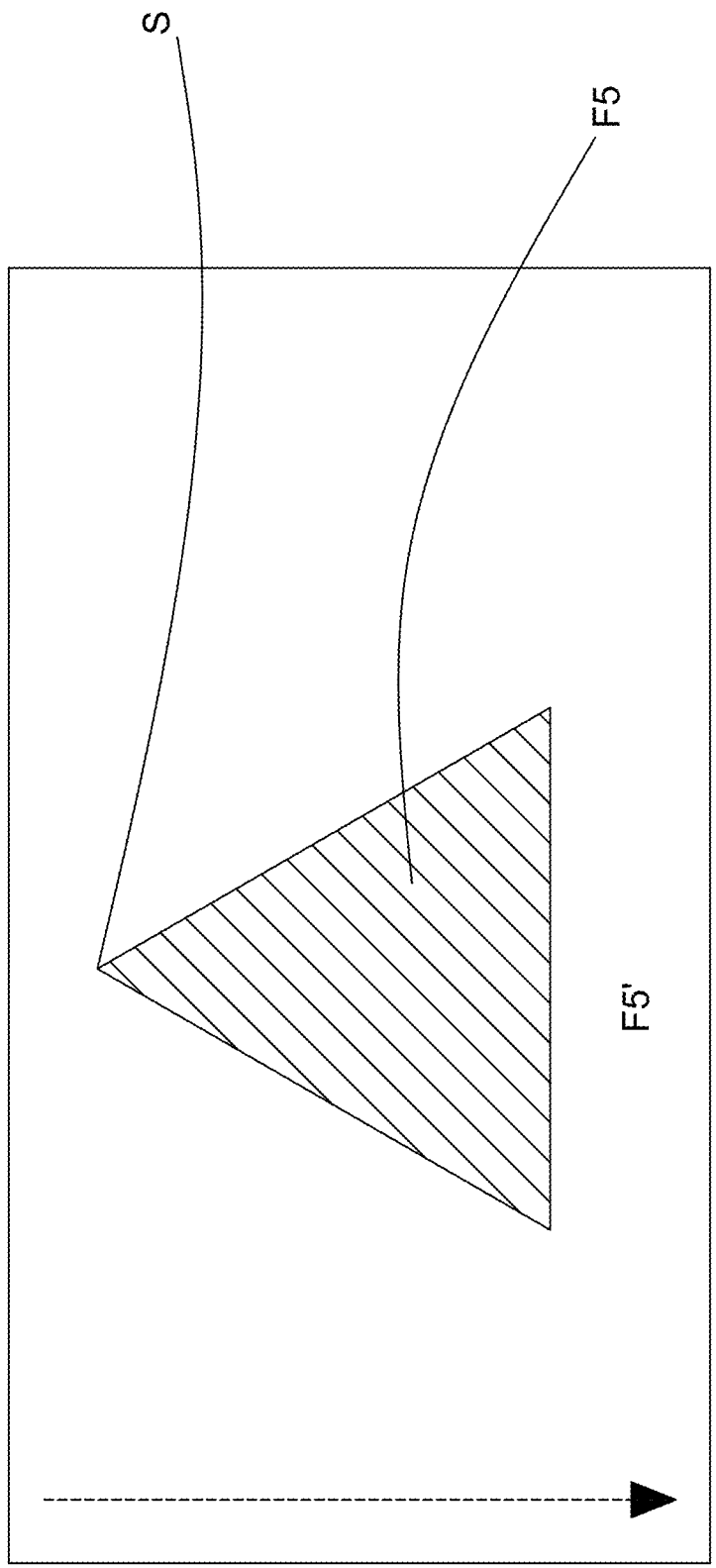
FIG. 5B is a schematic view showing the lens scan image F5' of an embodiment.

FIG. 5A is a schematic view showing the lens scan image F0' according to an embodiment. FIG. 5B is a schematic view showing the lens scan image F5' of an embodiment. Please refer to FIGS. 5A and 5B, the lens scanning method of the polyhedron lens architecture of this embodiment is suitable for the polyhedron lens architecture, and the polyhedron lens architecture 200 of this embodiment is not symmetrical about the horizontal plane H. The difference between the lens of the upper half part 201 and the lens of the lower half part 202 is that the lens of the lower half part 202 is disposed with a rotation of 180 degrees. Thus, when the polyhedron lens architecture 200 is performing the rolling shutter scan step, all lenses 21 of the upper half part 201 take the apex N of the upper hemisphere C1U or the point near the apex N as the scan start position of the lenses 21, and all lenses 21 of the lower half part 202 take the apex S of the lower hemisphere C2D or the point near the apex S as the scan start position of the lenses 21. All lenses 21 of the upper half part 201 and all lenses 21 of the lower half part 202 concurrently scan to the horizontal plane H or the plane near the horizontal plane H to function as the scan ending position of the lens 21, as indicated by the arrow in the drawing. The subsequent operations are the same as those mentioned hereinabove, and detailed descriptions thereof will be omitted here.

In this embodiment, because the scan ending times of the boundaries E3 to E8 of the effective images F0 to F5 are the same as or close to each other, the conventional problems of the large generated frame difference between the lens interleave portions and the poor image mosaicking can be solved.

Figure 6A:
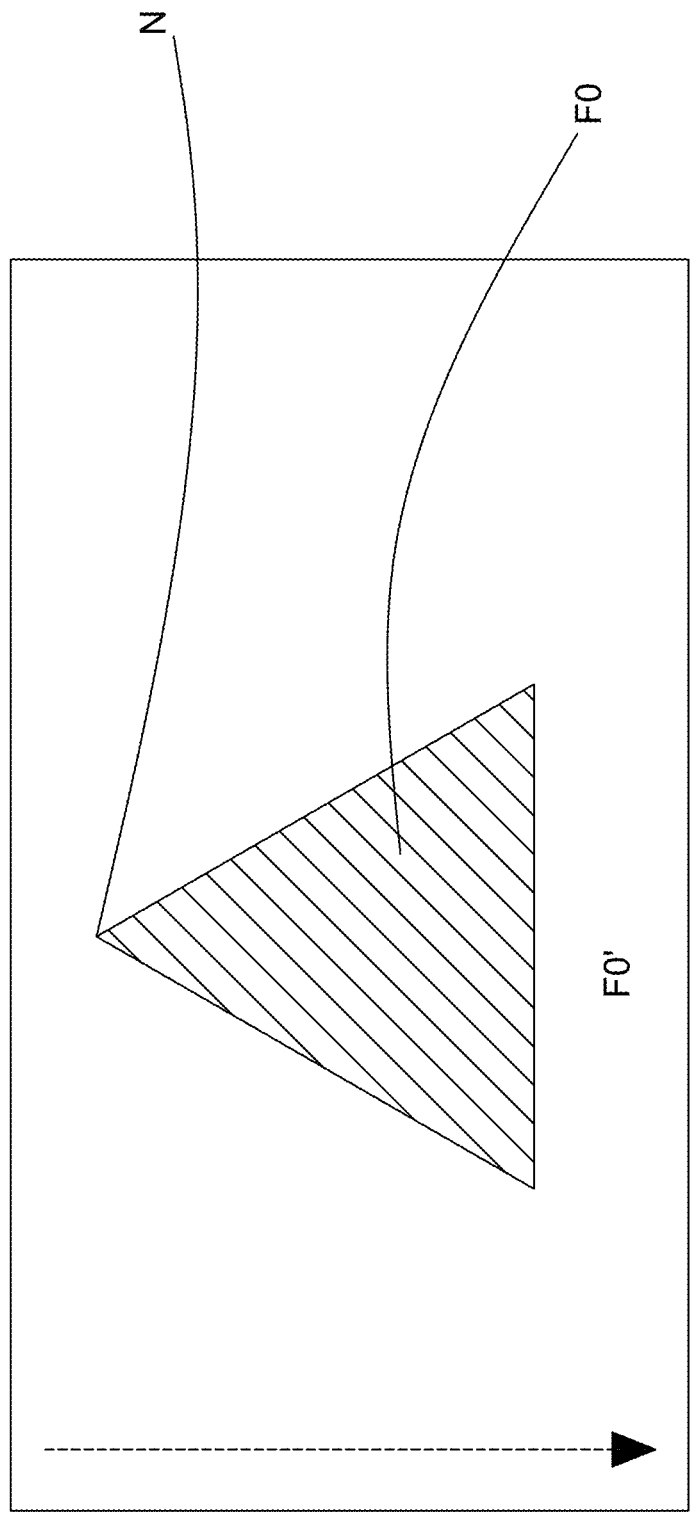
FIG. 6A is a schematic view showing the lens scan image F0' of an embodiment.
Figure 6B:
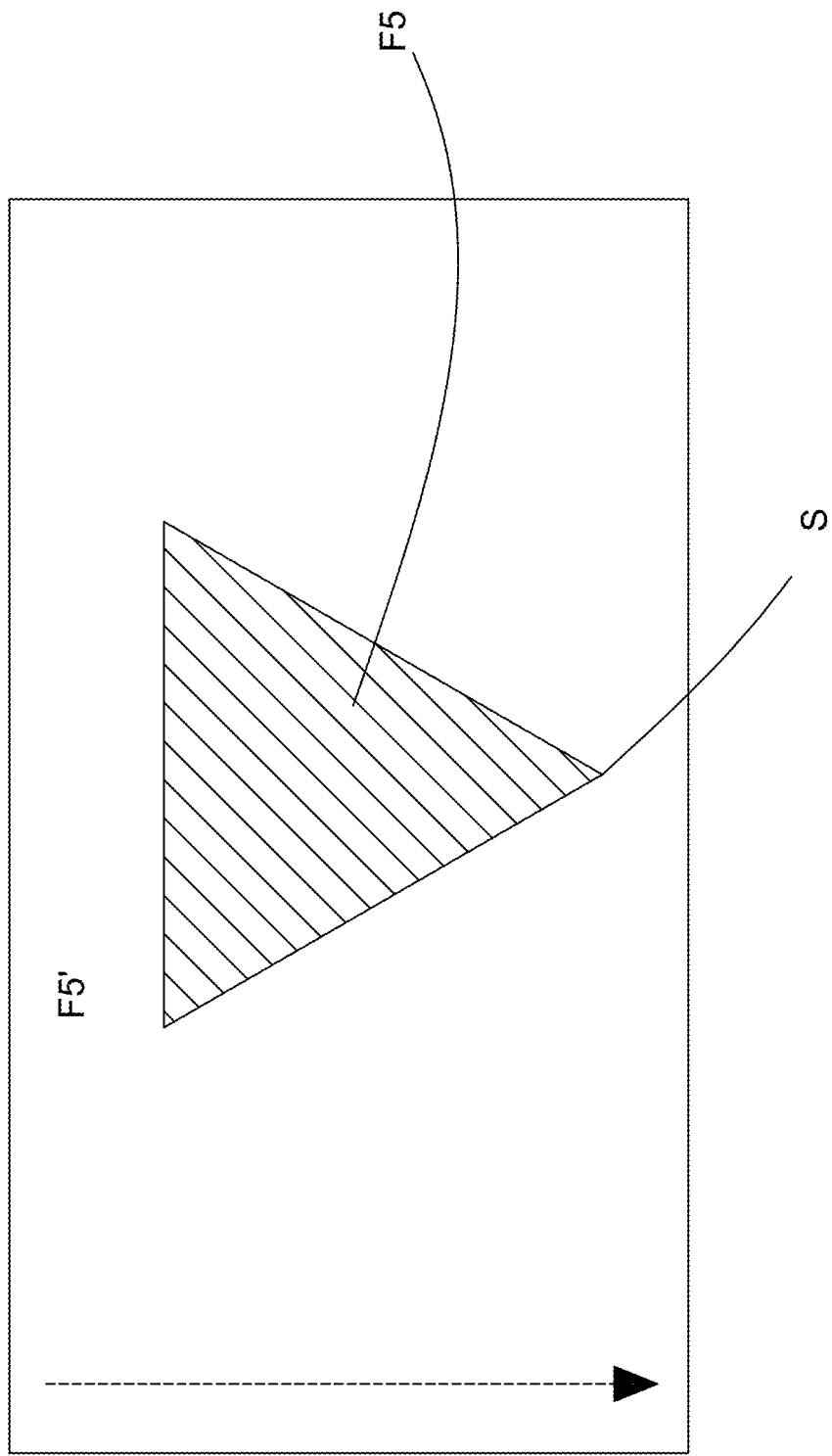
FIG. 6B is a schematic view showing the lens scan image F5' of an embodiment.

FIG. 6A is a schematic view showing the lens scan image F0' of an embodiment. FIG. 6B is a schematic view showing the lens scan image F5' of an embodiment. Referring to FIGS. 6A and 6B, the lens scanning method of the polyhedron lens architecture of this embodiment is suitable for the polyhedron lens architecture, and the polyhedron lens architecture 200 of this embodiment is not symmetrical about the horizontal plane H. In addition, when the polyhedron lens architecture 200 performs the rolling shutter scan step, all lenses 21 of the upper half part 201 take the apex N of the upper hemisphere C1U or the point near the apex N as the scan start position of the lens 21, and all lenses 21 of the upper half part 201 concurrently scan to the horizontal plane H or the plane near the horizontal plane H as the scan ending position of the lens 21 of the upper half part 201. Next, all lenses 21 of the lower half part 202 continue scanning the images. That is, all lenses 21 of the lower half part 202 take the horizontal plane H or the plane near the horizontal plane H as the scan start position of the lens 21 to continue scanning. Finally, all lenses 21 of the lower half part 202 scan to the apex S of the lower hemisphere C2D or the point near the apex S functioning as the scan ending position, as shown by the arrow in the drawing. The subsequent operations are mentioned hereinabove, and detailed descriptions thereof will be omitted here.

In this embodiment, because scanning of the boundaries E3 to E8 of the effective images F0 to F5 is continued from the lower half part to the upper half part (or from the upper half part to the lower half part), the boundaries E3 to E8 are free from the problem of the too long scan time difference. The conventional problems of the large generated frame difference between the lens interleave portions and the poor image mosaicking can be solved.

Figure 7A:
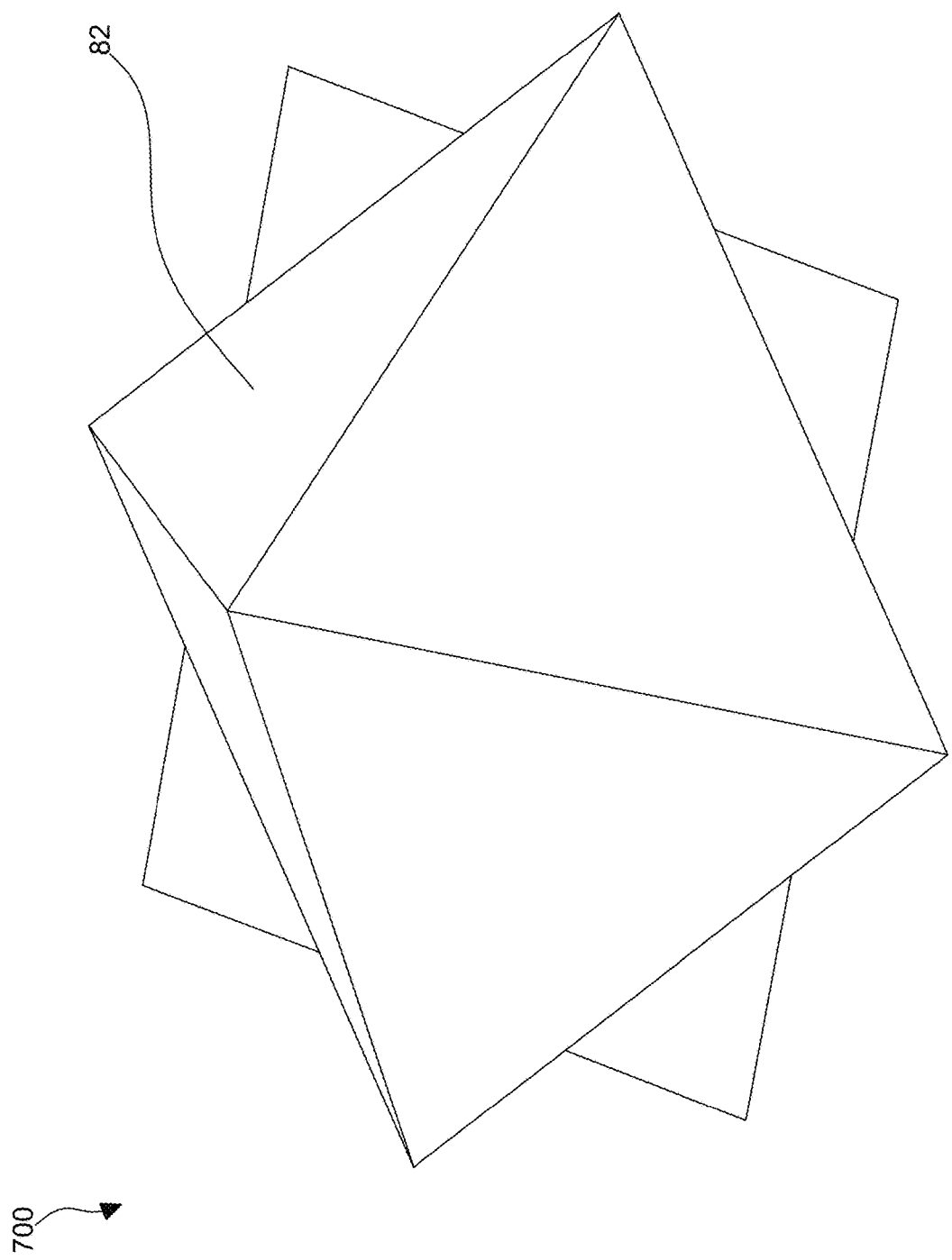
FIG. 7A is a pictorial view showing the base of the polyhedron lens architecture of an embodiment.
Figure 7B:
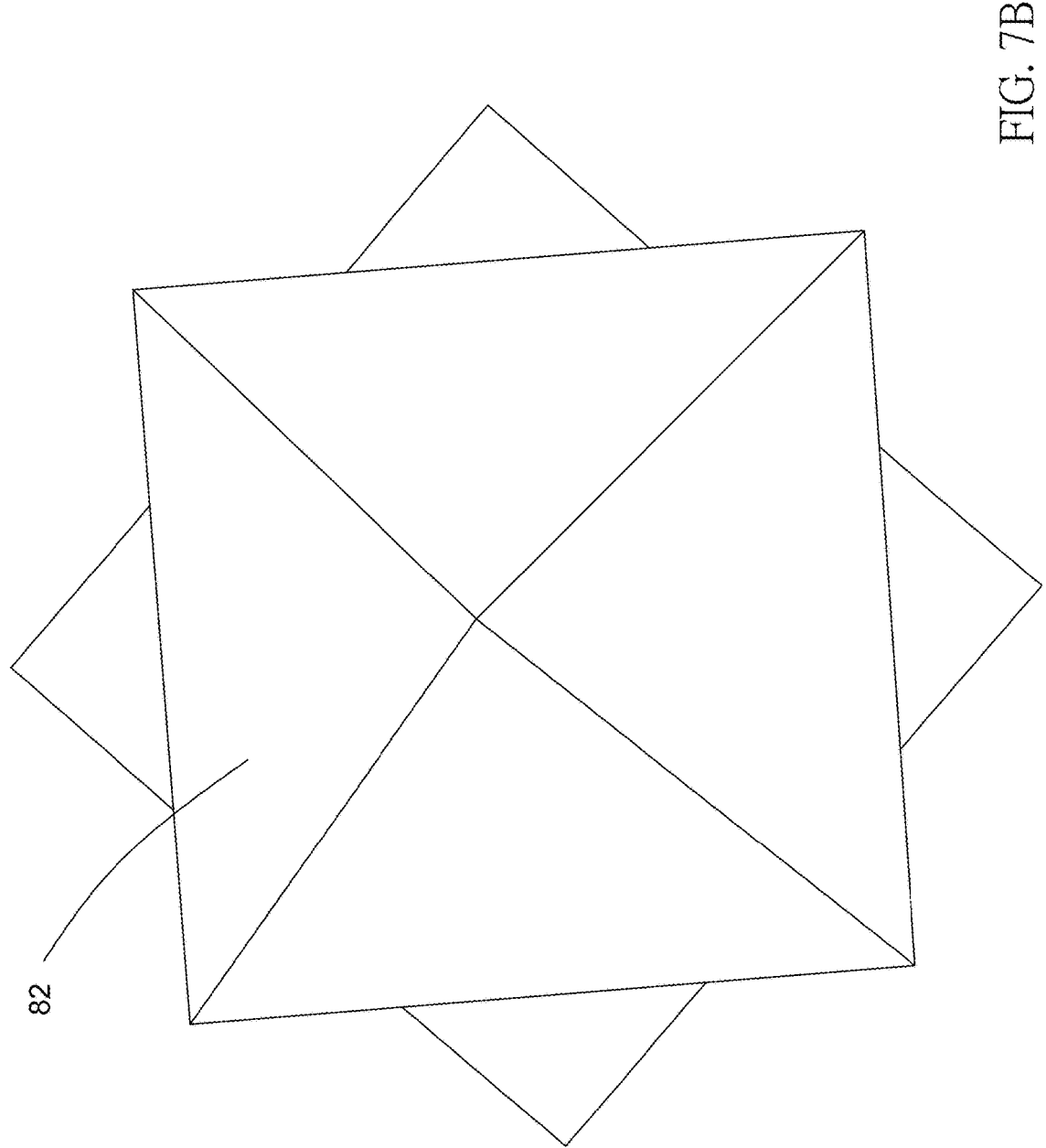
FIG. 7B is a schematic top view showing the polyhedron lens architecture.

FIG. 7A is a pictorial view showing the base of the polyhedron lens architecture of an embodiment. FIG. 7B is a schematic top view showing the polyhedron lens architecture. Referring to FIGS. 7A and 7B, please note that for the sake of conciseness, FIGS. 7A and 7B only depict the portion of the base for explanation. A polyhedron lens architecture 700 is an octahedron lens structure. That is, the upper half part or the lower half part has four lenses and four bases 82, and this is the same as that mentioned hereinabove. The optical axes of the lenses (not shown) on the bases 82 still intersect at a central point O (not shown), and the lens surface of each lens is still inscribed to a virtual sphere, wherein the other structures and operation principles are the same as those mentioned hereinabove, and detailed descriptions thereof will be omitted here. The bases of the upper half part of the polyhedron lens architecture or the bases of the lower half part of the polyhedron lens architecture constitute a pyramidal shape.

Figure 8A:
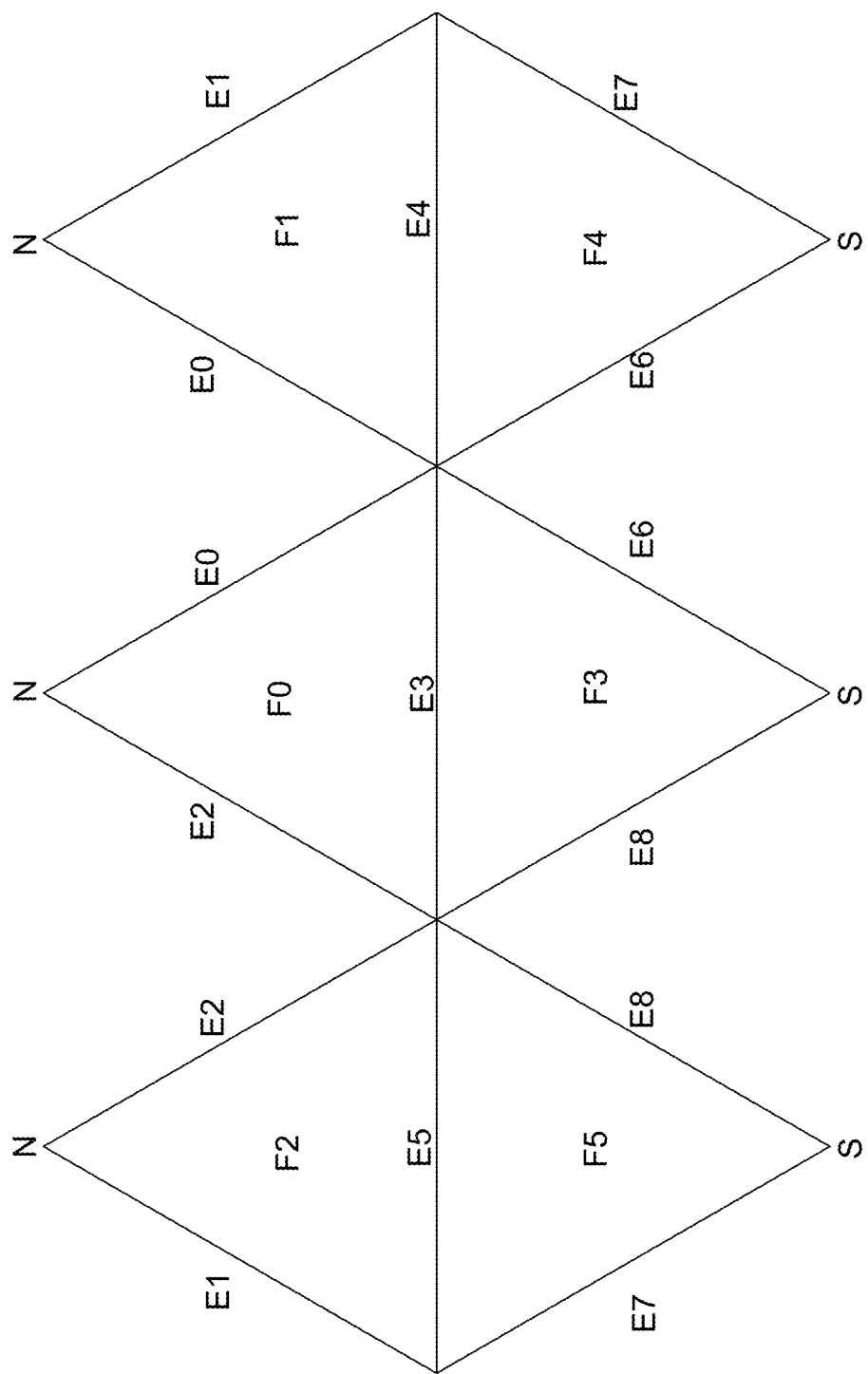
FIG. 8A is a schematic view showing a combination of all effective images of an embodiment.
Figure 8B:
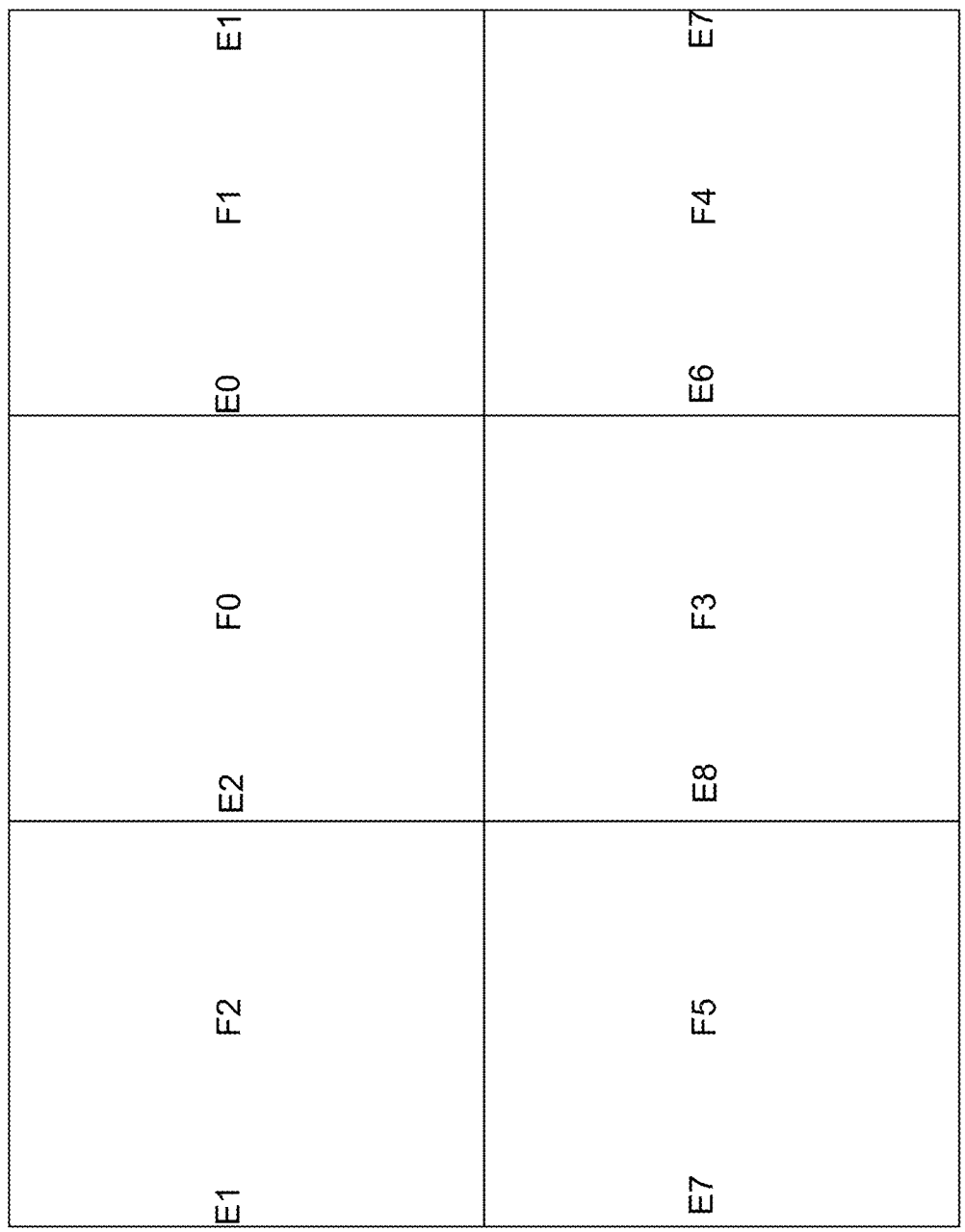
FIG. 8B is an equirectangular schematic view of FIG. 8A.

FIG. 8A is a schematic view showing a combination of all effective images of an embodiment. FIG. 8B is an equirectangular schematic view of FIG. 8A. Referring finally to FIGS. 8A, 8B and 2F, it is to be noted that FIGS. 8A and 8B are generated according to the structure of FIG. 2F performing the image scanning. In the structure of FIG. 2F, the bases 22 of the upper half part 201 and the bases 22 of the lower half part 202 are disposed and symmetrical with respect to the horizontal plane H. Other operation principles are the same as those mentioned hereinabove, and detailed descriptions thereof will be omitted here.

In summary, the polyhedron lens architecture of the invention is not restricted to the hexahedron lens or octahedron lens. As long as all lenses can satisfy to condition of inscribing to a virtual sphere, and the optical axes of the lenses can intersect at a structural center of the polyhedron lens architecture or the spherical center of the virtual sphere. The structure of the invention can solve the defect generated on the image boundary and by the scan time difference. In addition, the lens scanning method of the polyhedron lens architecture does not restrict the horizontal plane to the start position, and the horizontal plane may also be the scan ending position. So, the invention can solve the conventional problems of the large generated frame difference between the lens interleave portions and the poor image mosaicking can be solved.

What is claimed is:

1. A polyhedron lens architecture disposed in a virtual sphere having a horizontal plane, an upper hemisphere above the horizontal plane, and a lower hemisphere below the horizontal plane, wherein the polyhedron lens architecture has an upper half part above the horizontal plane and a lower half part below the horizontal plane, the polyhedron lens architecture comprising:
   multiple bases, which are respectively disposed on the upper half part and the lower half part; and
   multiple lenses respectively disposed on surfaces of the bases;
   wherein optical axes of the lenses intersect at a central point of the virtual sphere, the central point is located at the horizontal plane, and the central point is a structural center of the polyhedron lens architecture; and a lens scanning method suitable for the polyhedron lens architecture lens scanning method comprising:
   a rolling shutter scan step, all lenses located at the upper half part concurrently scan from the horizontal plane to an apex of the upper hemisphere, and all lenses located at the lower half part also concurrently scan from the horizontal plane to an apex of the lower hemisphere; or all lenses located at the upper half part concurrently perform scanning from the apex of the upper hemisphere to the horizontal plane, and all lenses of the lower half part continue to perform concurrent scanning from the horizontal plane to the apex of the lower hemisphere.

2. The polyhedron lens architecture according to claim 1, wherein lens surfaces of the lenses are inscribed to the virtual sphere, and the bases are respectively disposed on the upper half part or the lower half part and equally divide the upper hemisphere or the lower hemisphere.

3. The polyhedron lens architecture according to claim 2, wherein the optical axes of the lenses are different from one another or each other, and an included angle between one of the optical axes and the horizontal plane is smaller than 90 degrees.

4. The polyhedron lens architecture according to claim 3, wherein each of the bases comprises:
   a first portion, when the base is in the upper hemisphere, the first portion is disposed above the horizontal plane and extends up to close to the apex of the upper hemisphere;
   when the base is in the lower hemisphere, the first portion is below the horizontal plane and extends up to close to the apex of the lower hemisphere; wherein the first portion extends to close to the apex of the upper hemisphere of the virtual sphere or the apex of the lower hemisphere of the virtual sphere to form an inclined surface; and
   a second portion being a border of the base;
   wherein the second portions surround the apex of the upper hemisphere of the virtual sphere or the apex of the lower hemisphere of the virtual sphere, and the lenses are disposed on the inclined surfaces.

5. The polyhedron lens architecture according to claim 4, wherein included angles between the inclined surfaces of the upper half part and the horizontal plane are equal to 45 degrees.

6. The polyhedron lens architecture according to claim 4, wherein the polyhedron lens architecture has at least six lenses.

7. The polyhedron lens architecture according to claim 6, wherein the second portions surround the apex of the upper hemisphere of the virtual sphere or the apex of the lower hemisphere of the virtual sphere, and edges of the second portions surround to form a triangle-like structure.

8. The polyhedron lens architecture according to claim 3, wherein the bases of the upper half part of the polyhedron lens architecture or the bases of the lower half part of the polyhedron lens architecture constitute a pyramidal shape.

* * * * *